US012737695B1

(12) United States Patent
Hicks, III et al.

(10) Patent No.: US 12,737,695 B1
(45) Date of Patent: Sep. 15, 2026

(54) SYSTEMS AND METHODS FOR BOOKING SHARED SPACES

(71) Applicant: Visix, Inc., Peachtree Corners, GA (US)

(72) Inventors: Claud M. Hicks, III, Marietta, GA (US); Sean M. Matthews, Norcross, GA (US)

(73) Assignee: Visix, Inc., Norcross, GA (US)

( * ) Notice: Subject to any disclaimer, the term of this patent is extended or adjusted under 35 U.S.C. 154(b) by 0 days.

(21) Appl. No.: 18/335,795

(22) Filed: Jun. 15, 2023

(51) Int. Cl.
*G06Q 10/02* (2012.01)
*G06K 7/14* (2006.01)
*G06T 11/00* (2026.01)

(52) U.S. Cl.
CPC .............. *G06Q 10/02* (2013.01); *G06T 11/00* (2013.01); *G06K 7/1417* (2013.01); *G06T 2200/24* (2013.01)

(58) Field of Classification Search
CPC ...... G06Q 10/02; G06T 11/00; G06T 2200/24
See application file for complete search history.

(56) References Cited

U.S. PATENT DOCUMENTS 5,933,391 A 8/1999 Uptegraph
10,375,306 B2 8/2019 Shan et al.
11,145,016 B1 * 10/2021 Brophy .............. G07C 9/00571
2019/0220665 A1 7/2019 Neumann et al.
2019/0370700 A1 * 12/2019 Ludwig .................. G06Q 10/00
2020/0242670 A1 * 7/2020 Thye ..................... H04L 47/822
2020/0302344 A1 9/2020 Just et al.
2021/0097450 A1 4/2021 Deluca et al.
2023/0067076 A1 * 3/2023 Wase ..................... G06Q 10/02
2023/0335294 A1 * 10/2023 Wolff ................... A61B 5/4824

FOREIGN PATENT DOCUMENTS

EP 3869771 A1 8/2021

OTHER PUBLICATIONS

C. Prakash, M. Akshatha, B. H. Anil Kumar, B. S. Lakshmi and P. Ashwini, "Integrated Web Based Augmented Reality (AR) and AI for Immersive Booking Experience," 2025 Annual International Conference on Data Science, Machine Learning and Blockchain Technology (AICDMB), Mysuru, India, 2025 (Year: 2025).*
https://www.visix.com/meeting-room-signs/ Dec. 31, 2006.
https://www.visionect.com/products/.
https://getjoan.com/room-booking-solution/.
https://www.condecosoftware.com/products/book/meeting-room-booking/.
https://www.condecosoftware.com/products/book/meeting-room-booking/meeting-room-screens/.
https://www.gettactic.com/meeting-room-booking-software/.
https://tangoanalytics.com/landing/meeting-room-reservation-software.
https://kadence.co/room-scheduling-software/.
https://smartway2.com/solutions/.

(Continued)

*Primary Examiner* — George Chen
*Assistant Examiner* — Danielle Elizabeth Zevitz
(74) *Attorney, Agent, or Firm* — Carlton Fields, PA; Eleanor M. Yost

(57) ABSTRACT

This invention relates to computer-implemented systems and methods for booking shared spaces and shared assets in real-time on personal electronic devices via a web-based augmented reality application and booking engine, without the need to download a dedicated mobile application.

19 Claims, 32 Drawing Sheets

(56) References Cited

OTHER PUBLICATIONS

Steelcase, RoomWizard II Scheduling System Classic Mode, 2014 (https://www.steelcase.com/content/uploads/2014/12/UserManual_5712.pdf).
GoBright, The Office of Future Smart Office Solutions To support Hybrid Working, Jan. 5, 2021 (https://www.youtube.com/watch?v=l87n0gdF4EU) Jan. 5, 2021.
GoBright, How To: Use the GoBright Desk Connect & Glow for a better Desk Management, Jan. 3, 2022 (https://youtu.be/0OMQCn0tTB4) Jan. 3, 2022.
https://gobright.com/smart-office/.
https://www.22miles.com/digital-signage-wayfinding/space-utilization/.
https://www.delfi.com/breece-system/digital-room-signage.
https://www.add-on.com/conference-room-signs/.
https://sync-sign.com/.
https://touchsource.com/products/room-space-signage.
https://www.novisign.com/hardware/meeting-rooms/.
https://mvix.com/solutions/meeting-room-signs/.
https://www.condecosoftware.com/campaigns/digital-signage/.
https://gogetcorp.com/workspace-solutions/goget-one/.
https://getjoan.com/shop/joan-6/.
https://uniguest.com/reserva-room-signage/.
https://www.iadea.com/products/10-inch-signboards/.
https://www.crestron.com/Products/Featured-Solutions/Room-Scheduling.
https://www.extron.com/product/tls725m.
https://www.yealink.com/en/product-detail/microsoft-teams-roompanel.

* cited by examiner

400

Dashboard
Spaces
Calendar Integrations
User Accounts
Organizations
Help
Log Out

DASHBOARD

Dashboard 410 420

123 MEETING ROOMS | 495 WORKSPACES | 49 OTHER 52,463 TOTAL VIEWS (PAST 30 DAYS)

MOST ACTIVE SPACES

Meeting Room 1230 / Atlanta Marketing Office 234 reservations
Meeting Room 1244 / Atlanta Sales Office 233 reservations
Meeting Room 1288 / Tampa Office 134 reservations

RECENT BOOKINGS

Meeting Room 1230 / Atlanta Marketing Office
Meeting Room 1244 / Atlanta Sales Office
Meeting Room 1230 / Atlanta Sales Office

| Subscription Licenses | Purchased | Used | Remaining | Start Date | End Date |
|---|---|---|---|---|---|
| Meeting Room | 20 | 20 | 0 | 00/00/000 | 00/00/000 |
| Workspace | 20 | 20 | 0 | 00/00/000 | 00/00/000 |
| Meeting Room | 20 | 20 | 0 | 00/00/000 | 00/00/000 |
| Workspace | 20 | 20 | 0 | 00/00/000 | 00/00/000 |
| Meeting Room | 20 | 20 | 0 | 00/00/000 | 00/00/000 |
| Workspace | 20 | 20 | 0 | 00/00/000 | 00/00/000 |
| Other | 20 | 20 | 0 | 00/00/000 | 00/00/000 |
| Meeting Room | 20 | 20 | 0 | 00/00/000 | 00/00/000 |
| Other | 20 | 20 | 0 | 00/00/000 | 00/00/000 |
| Workspace | 20 | 20 | 0 | 00/00/000 | 00/00/000 |

Prev 1 | 2 | 3 | 4 | 5 Next Showing 10 of 40 Display per page 10

430

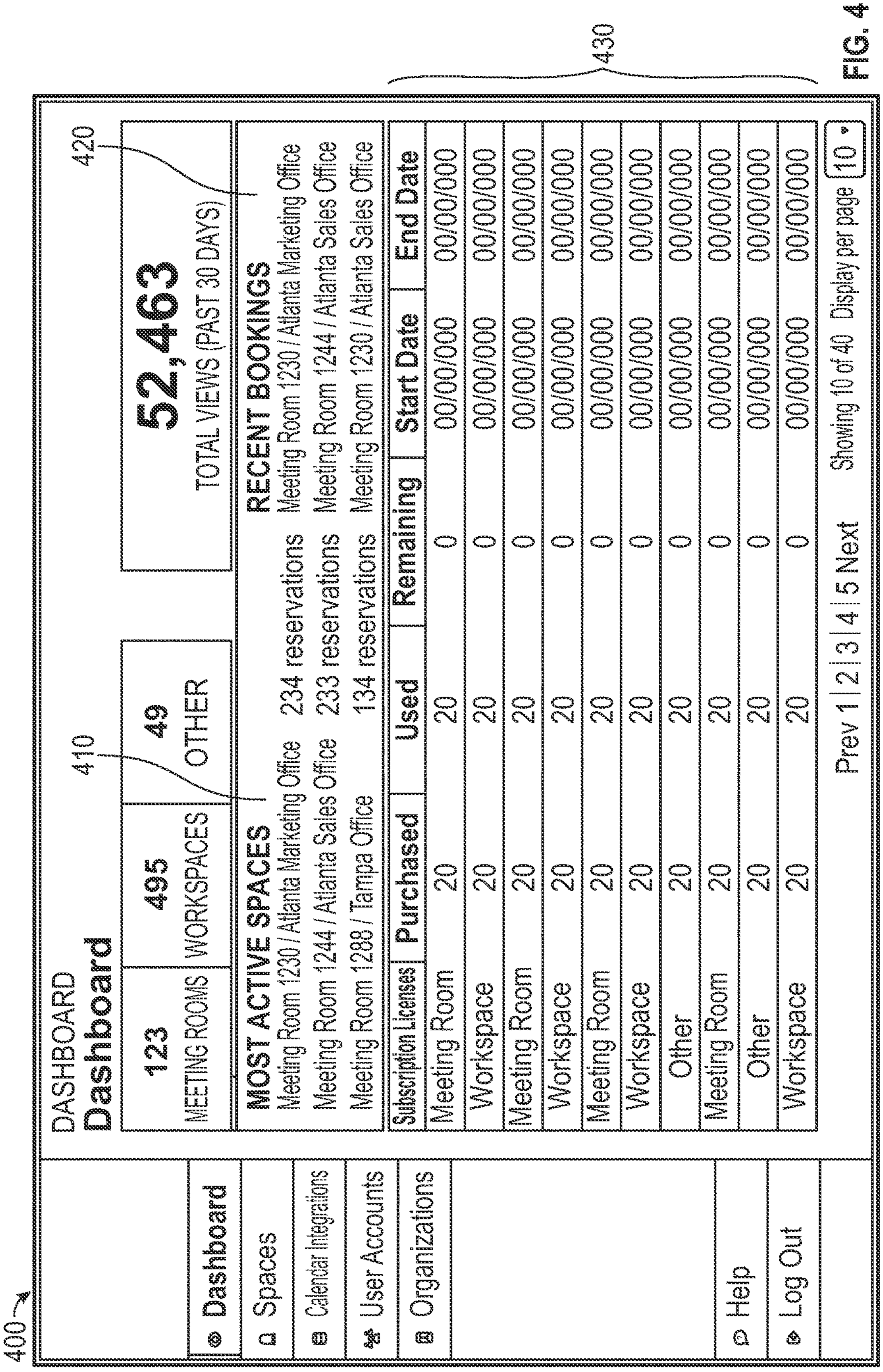

- Dashboard
- Spaces
- Calendar Integrations
- User Accounts
- Organizations
- Help
- Log Out

DASHBOARD / SPACES

Spaces ⊕ (Manage Space Types) Search Spaces

| ☐ | Name | Description | Space Type | Sub Org | Calendar Integrations | Bookable | |
|---|---|---|---|---|---|---|---|
| ☒ | Boardroom | Boardroom | Workspce | Atlanta | Exchange - EWS | True | Edit |
| ☒ | Room123 | TVA | Workspce | Atlanta | Exchange - EWS | True | Edit |
| ☒ | Room124 | Mystic Falls | Workspce | Atlanta | Exchange - EWS | True | Edit |
| ☐ | Room125 | Room 125 | Workspce | Atlanta | Exchange - EWS | True | Edit |
| ☐ | Room 126 | Room 126 | Workspce | Atlanta | Exchange - EWS | True | Edit |
| ☐ | Room 127 | Room 127 | Workspce | Atlanta | Exchange - EWS | True | Edit |
| ☐ | Room 128 | All Valley | Workspce | Atlanta | Exchange - EWS | True | Edit |
| ☐ | Room 129 | Woodhouse | Workspce | Atlanta | Exchange - EWS | True | Edit |
| ☐ | Room 130 | Room 130 | Workspce | Atlanta | Exchange - EWS | True | Edit |
| ☐ | Room 131 | Room 131 | Workspce | Atlanta | Exchange - EWS | True | Edit |

3 Spaces Selected Copy | Delete Prev 1 | 2 | 3 | 4 | 5 Next Showing 10 of 40 Display per page 10

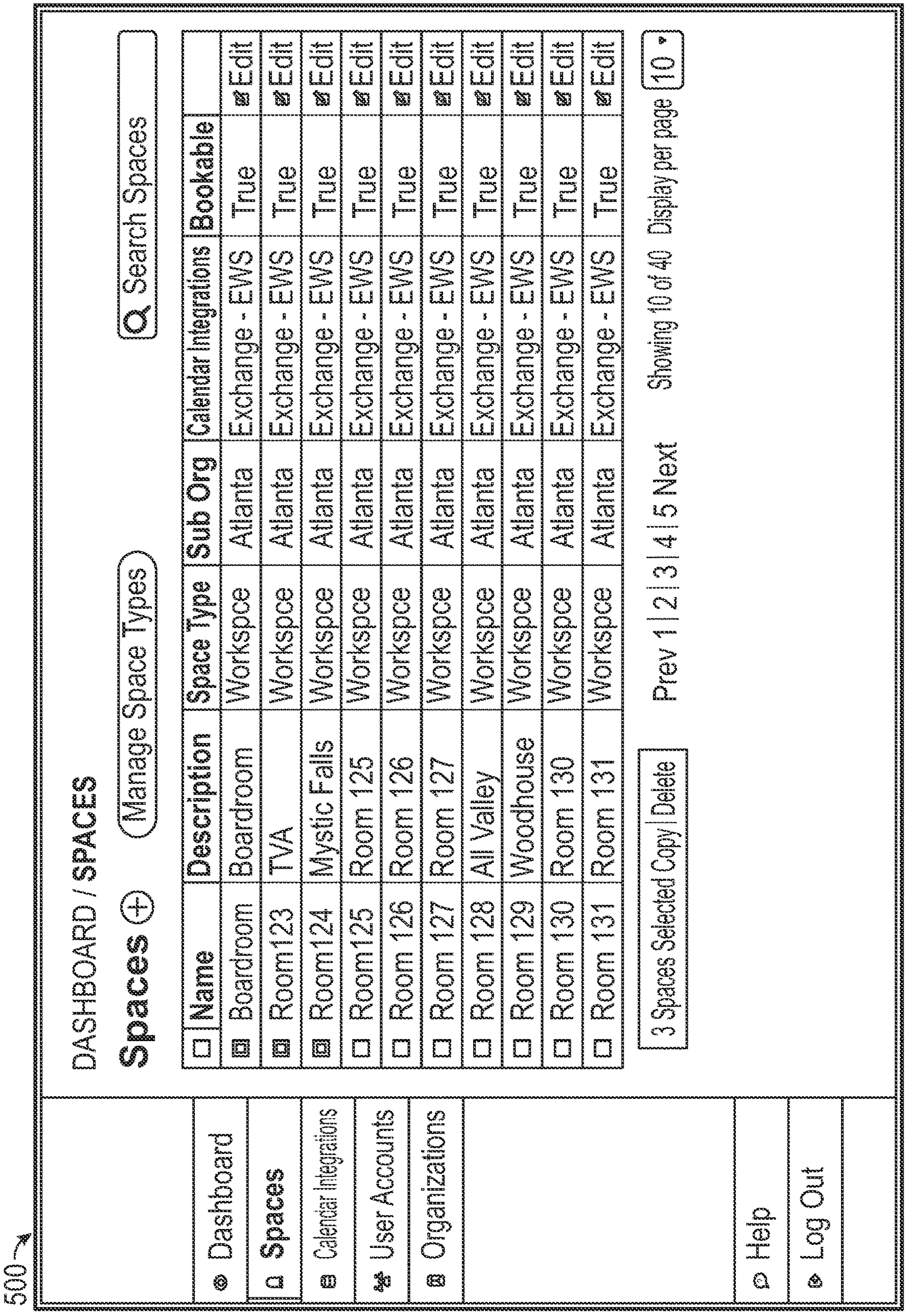

Dashboard
Spaces
Calendar Integrations
User Accounts
Organizations
Help
Log Out

DASHBOARD / SPACES / MANAGE SPACES / EDIT SPACE

Edit Space Type: Pool Table

Last Modified
Sep 25, 2023 9:21:15 AM EST

Name
610

Description
620

*This space type will use "other" license*

Cancel
Save

700

Dashboard
Spaces
Calendar Integrations
User Accounts
Organizations
Help
Log Out

DASHBOARD / SPACES / MANAGE SPACES

Space Type ⊕

Search Spaces

| ☐ | Name | Description | Count | |
|---|---|---|---|---|
| | Workspace | Desks, lounges, and cubicles | 27 | |
| | Meeting Room | Conference rooms and meeting rooms | 10 | |
| ☒ | Basketball Court | Basketball courts | 1 | Edit |
| ☒ | Pool Table | Pool Table | 1 | Edit |
| ☒ | Private Office | Private offices | 1 | Edit |

3 Layouts Selected Copy | Delete

Showing 5 of 5 Display per page 10

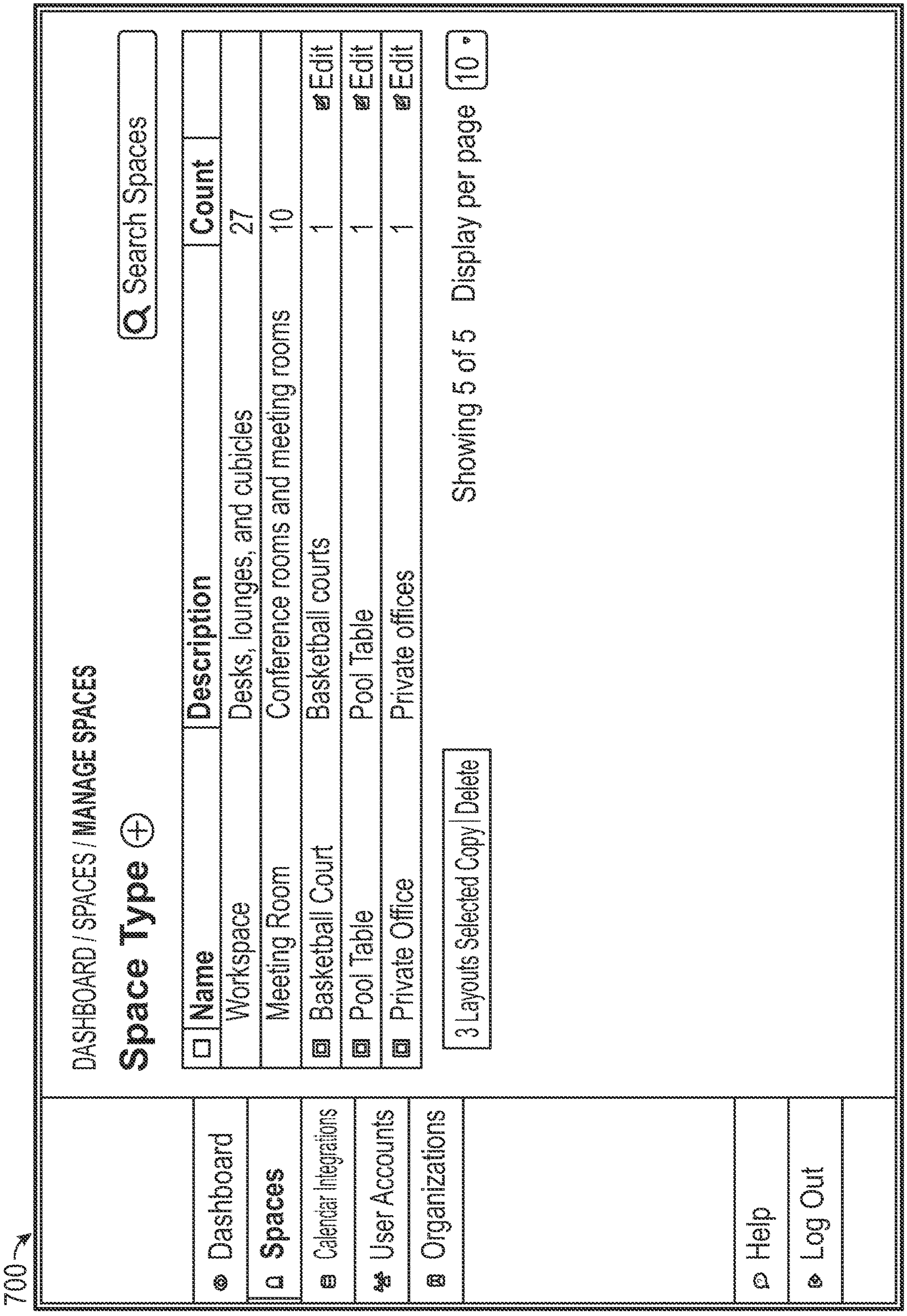

Dashboard
Spaces
Calendar Integrations
User Accounts
Organizations
Help
Log Out

ADMINISTRATION / CALENDAR INTEGRATIONS / ADD CALENDAR INTEGRATION

Add Calendar Integration

Last Modified
Oct 18, 2023 9:21:15 AM EST

Name

Description

Calendar Type
Exchange - Microsoft

Tenant ID

Client ID

Client Secret

Cancel
Save

1000

Dashboard
Spaces
Calendar Integrations
User Accounts
Organizations
Help
Log Out

ADMINISTRATION / CALENDAR INTEGRATIONS

Calendar Integrations ⊕

Search Spaces

| ☐ | Calendar | Calendar Description | Calendar Type | Last Date Modified | |
|---|---|---|---|---|---|
| ☒ | Exchange - EWS | Boardroom | Exchange - EWS | Jul 04, 2023 09:21:23 AM EST | Edit |
| ☒ | Exchange - EWS - Raleigh | Raleigh Office 365 account | Exchange - EWS | Exchange - EWS | Edit |
| ☒ | Room124 | Mystic Falls | Google | Exchange - EWS | Edit |
| ☐ | Room125 | Room125 | EMS | Exchange - EWS | Edit |
| ☐ | Room126 | Room126 | EMS Platfrom Service | Exchange - EWS | Edit |
| ☐ | Room127 | Room127 | CollegeNET | Exchange - EWS | Edit |
| ☐ | Room128 | All Valley | JSON | Exchange - EWS | Edit |
| ☐ | Room129 | Woodhouse | XML | Exchange - EWS | Edit |

3 Calendar Accounts Selected Copy | Delete

Showing 8 of 8 Display per page 10

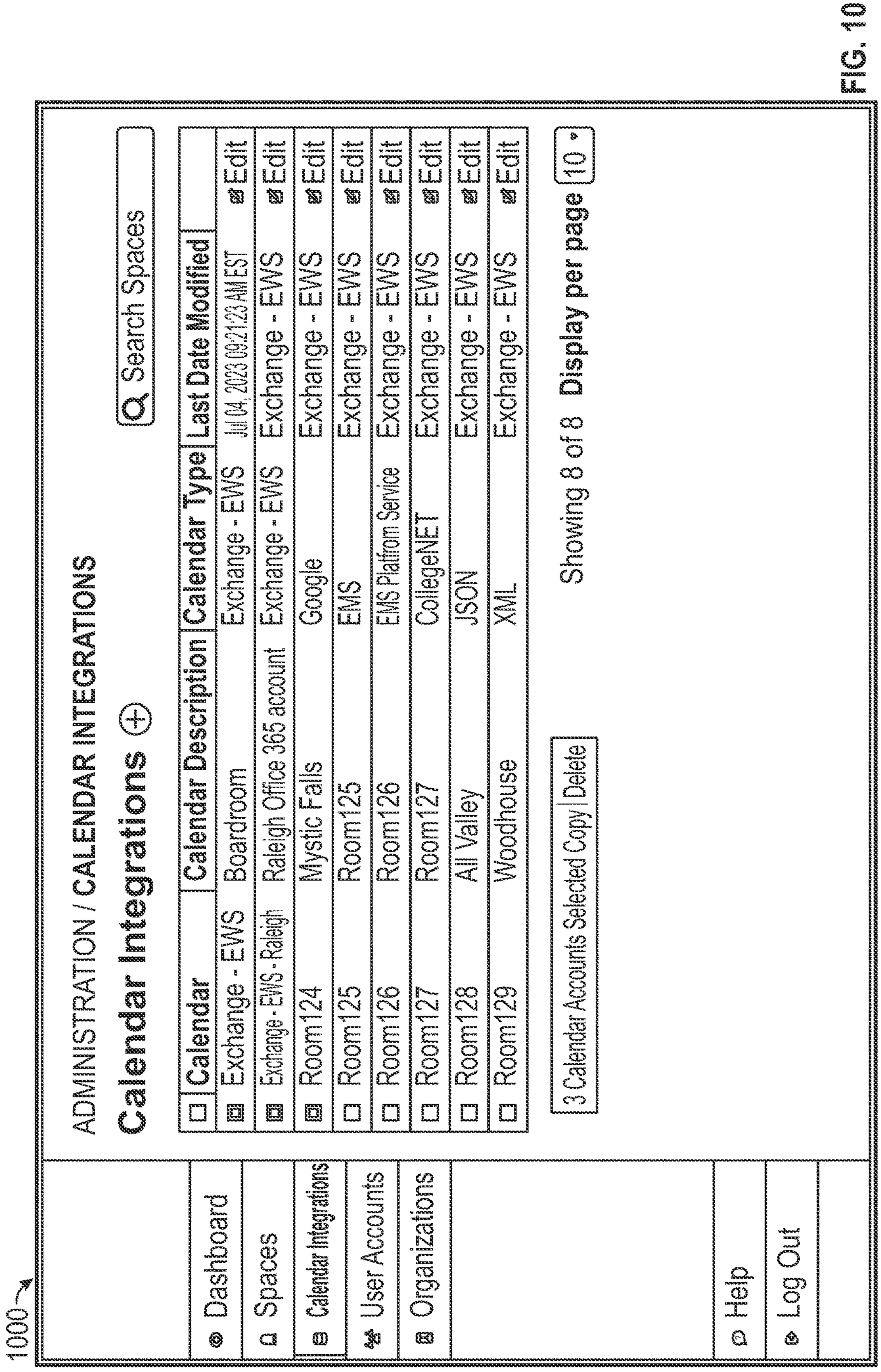

Dashboard
Spaces
Calendar Integrations
User Accounts
Organizations
Help
Log Out

ADMINISTRATION / ORGANIZATIONS

Organization: ACME

Last Modified

Dec 25, 2023 9:21:15 AM EST

Name

Description

Global Settings

Limit Walk-up Reservation Hours

Enable PIN- Protection for Walk-Up Reservations

Master Unlock PIN

Save

Suborganizations (3)

| | Name | Description | Suborganizations | Buildings | |
|---|---|---|---|---|---|
| | US | Donec ut porta ipsum. in vestibulum dui a mi susc.... | 3 | 0 | Edit |
| | Europe | Donec ut porta ipsum. in vestibulum dui a mi susc.... | 4 | 0 | Edit |
| | Asia | Donec ut porta ipsum. in vestibulum dui a mi susc.... | 7 | 0 | Edit |

Save

Buildings

There are no buildings associated with this level

Save

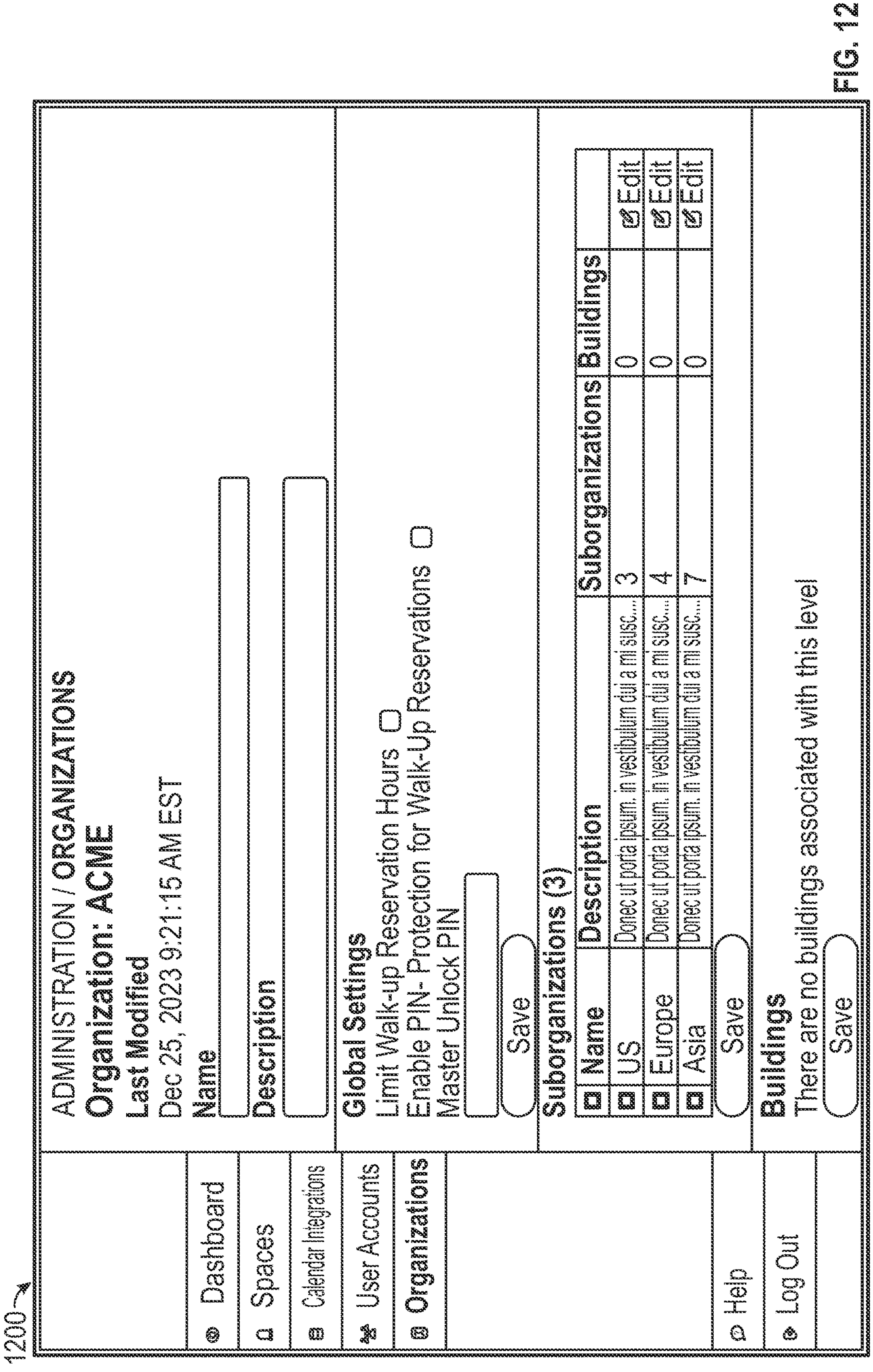

FIG. 12

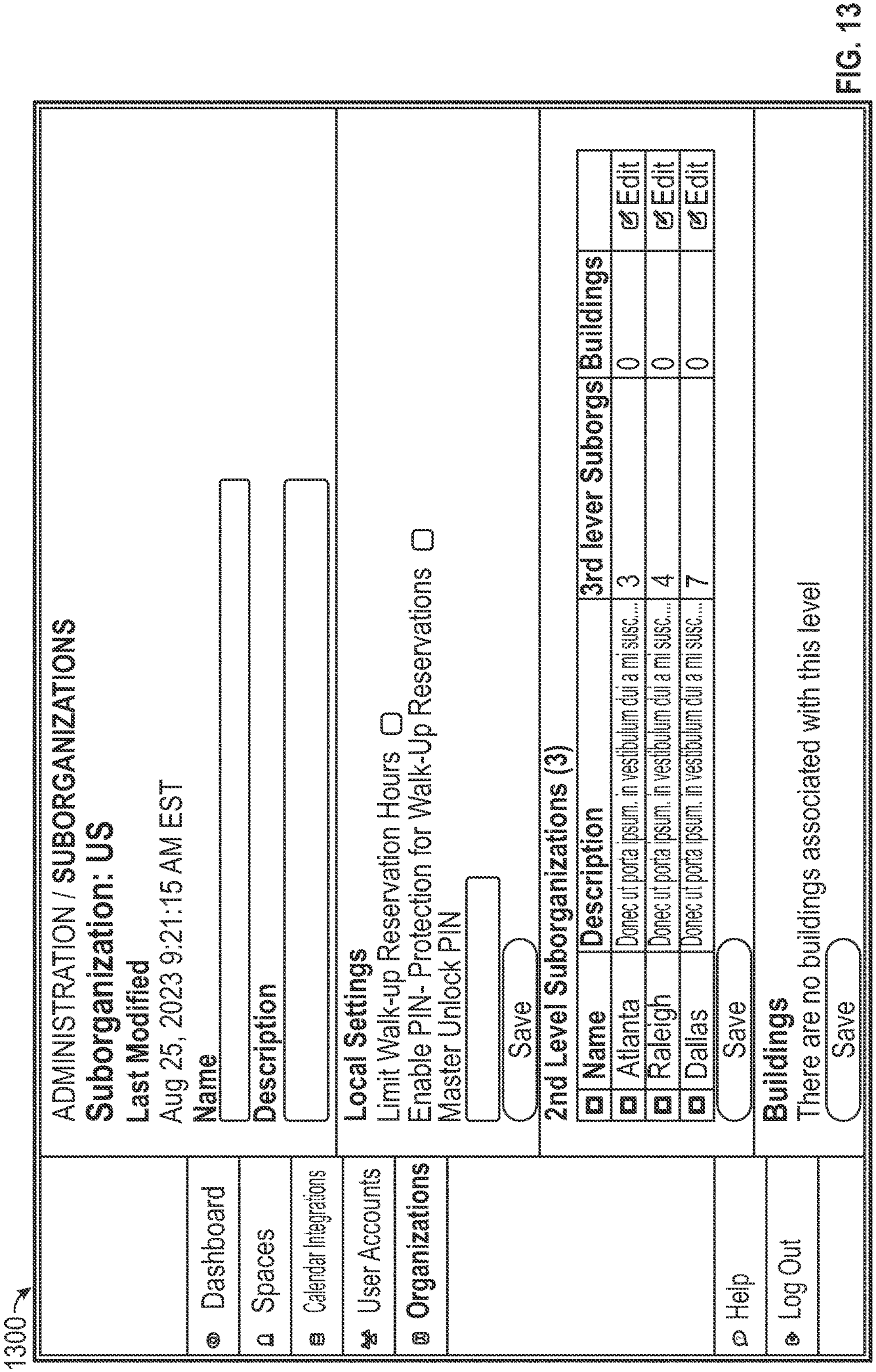

Dashboard
Spaces
Calendar Integrations
User Accounts
Organizations
Help
Log Out

ADMINISTRATION / SUBORGANIZATIONS

Suborganization: US

Last Modified
Aug 25, 2023 9:21:15 AM EST

Name

Description

Local Settings
Limit Walk-up Reservation Hours ☐
Enable PIN- Protection for Walk-Up Reservations ☐
Master Unlock PIN Save

2nd Level Suborganizations (3)

| ☐ | Name | Description | 3rd lever Suborgs | Buildings | |
|---|---|---|---|---|---|
| ☐ | Atlanta | Donec ut porta ipsum. in vestibulum dui a mi susc.... | 3 | 0 | Edit |
| ☐ | Raleigh | Donec ut porta ipsum. in vestibulum dui a mi susc.... | 4 | 0 | Edit |
| ☐ | Dallas | Donec ut porta ipsum. in vestibulum dui a mi susc.... | 7 | 0 | Edit |

Save

Buildings
There are no buildings associated with this level

Save

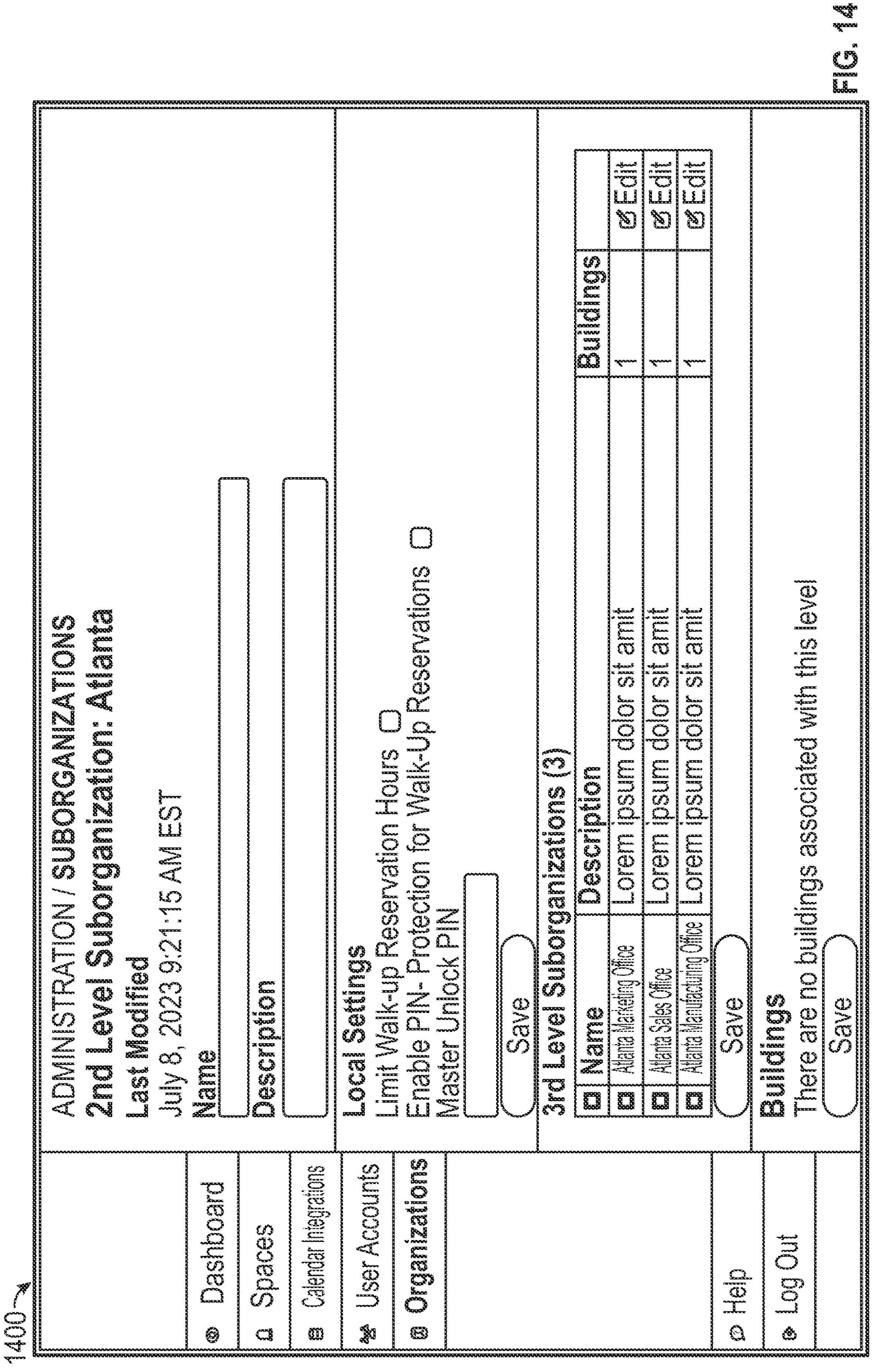

Dashboard
Spaces
Calendar Integrations
User Accounts
Organizations
Help
Log Out

ADMINISTRATION / SUBORGANIZATIONS

2nd Level Suborganization: Atlanta

Last Modified
July 8, 2023 9:21:15 AM EST

Name

Description

Local Settings
Limit Walk-up Reservation Hours ☐
Enable PIN- Protection for Walk-Up Reservations ☐
Master Unlock PIN Save

3rd Level Suborganizations (3)

| ☐ | Name | Description | Buildings | |
|---|---|---|---|---|
| ☐ | Atlanta Marketing Office | Lorem ipsum dolor sit amit | 1 | Edit |
| ☐ | Atlanta Sales Office | Lorem ipsum dolor sit amit | 1 | Edit |
| ☐ | Atlanta Manufacturing Office | Lorem ipsum dolor sit amit | 1 | Edit |

Save

Buildings
There are no buildings associated with this level

Save

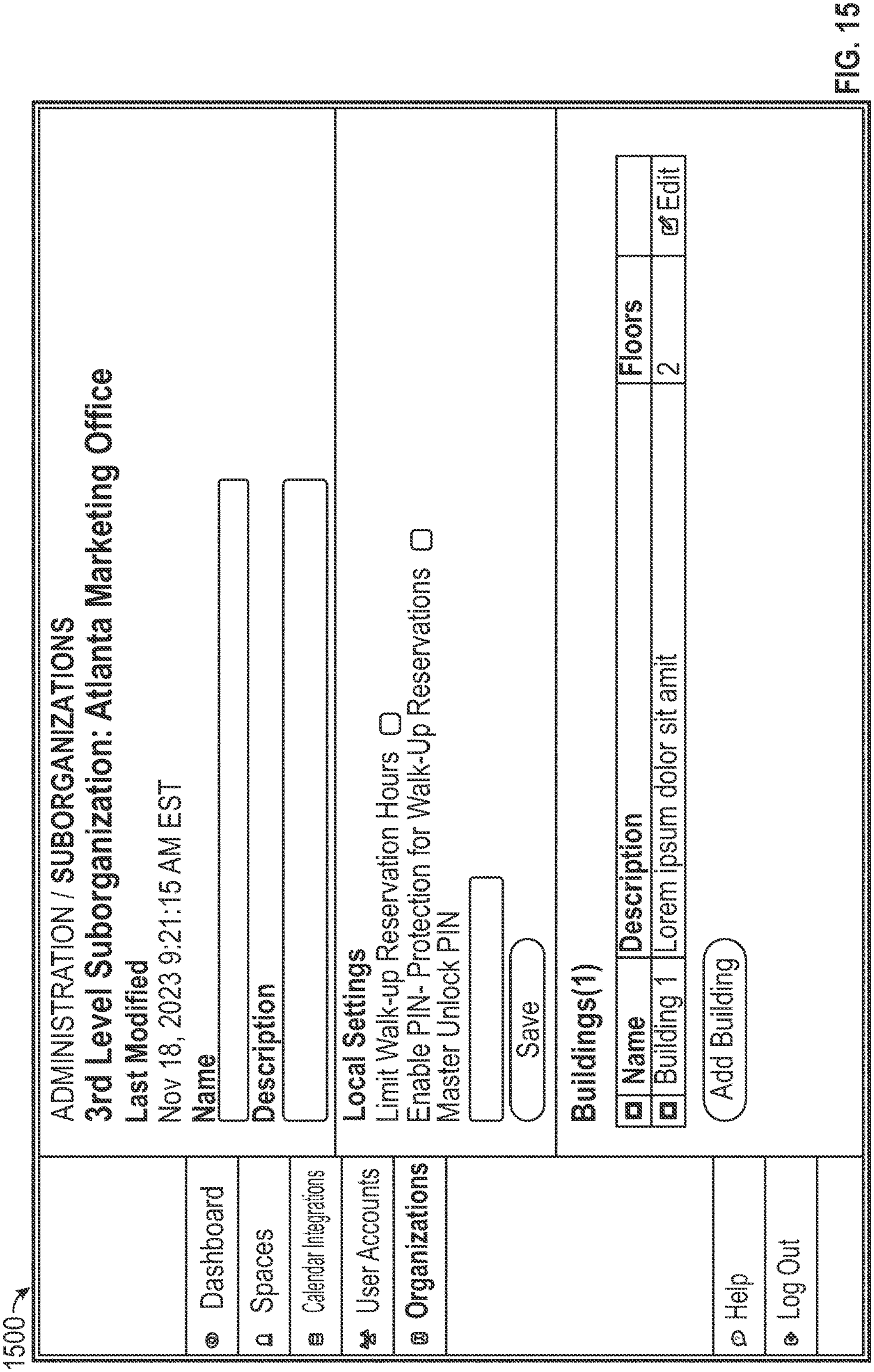

Dashboard
Spaces
Calendar Integrations
User Accounts
Organizations
Help
Log Out

ADMINISTRATION / SUBORGANIZATIONS

3rd Level Suborganization: Atlanta Marketing Office

Last Modified
Nov 18, 2023 9:21:15 AM EST

Name

Description

Local Settings

Limit Walk-up Reservation Hours ☐
Enable PIN- Protection for Walk-Up Reservations ☐
Master Unlock PIN Save

Buildings(1)

| ☐ | Name | Description | Floors | |
|---|---|---|---|---|
| ☐ | Building 1 | Lorem ipsum dolor sit amit | 2 | Edit |

Add Building

1600

Dashboard
Spaces
Calendar Integrations
User Accounts
Organizations
Help
Log Out ADMINISTRATION / GLOBAL SETTINGS
Atlanta Marketing Office: Building 1
Last Modified
Dec 28, 2023 9:21:15 AM EST
Name
Description

Floors(2)

| | Name | Description | |
|---|---|---|---|
| ☐ | Floor 1 | Lorem ipsum dolor sit amit | Edit |
| ☐ | Floor 2 | Lorem ipsum dolor sit amit | Edit |

Add Floor

1700

Dashboard
Clients
Help
Logout

DASHBOARD
Dashboard

245
Total Clients

52,463
TOTAL SPACES MANAGED

Clients⊕

Search Clients

| Client Name | Meeting Rooms | Work Space | Others | Licenses Purchased | |
|---|---|---|---|---|---|
| Company A | 200 | 200 | 200 | 200 | Edit |
| Company B | 200 | 200 | 200 | 200 | Edit |
| Company C | 200 | 200 | 200 | 200 | Edit |
| Company D | 200 | 200 | 200 | 200 | Edit |
| Company E | 200 | 200 | 200 | 200 | Edit |
| Company F | 200 | 200 | 200 | 200 | Edit |
| Company G | 200 | 200 | 200 | 200 | Edit |
| Company H | 200 | 200 | 200 | 200 | Edit |
| Company I | 200 | 200 | 200 | 200 | Edit |
| Company J | 200 | 200 | 200 | 200 | Edit |

Prev 1 | 2 | 3 | 4 | 5 Next Showing 10 of 40 | Display per page 10

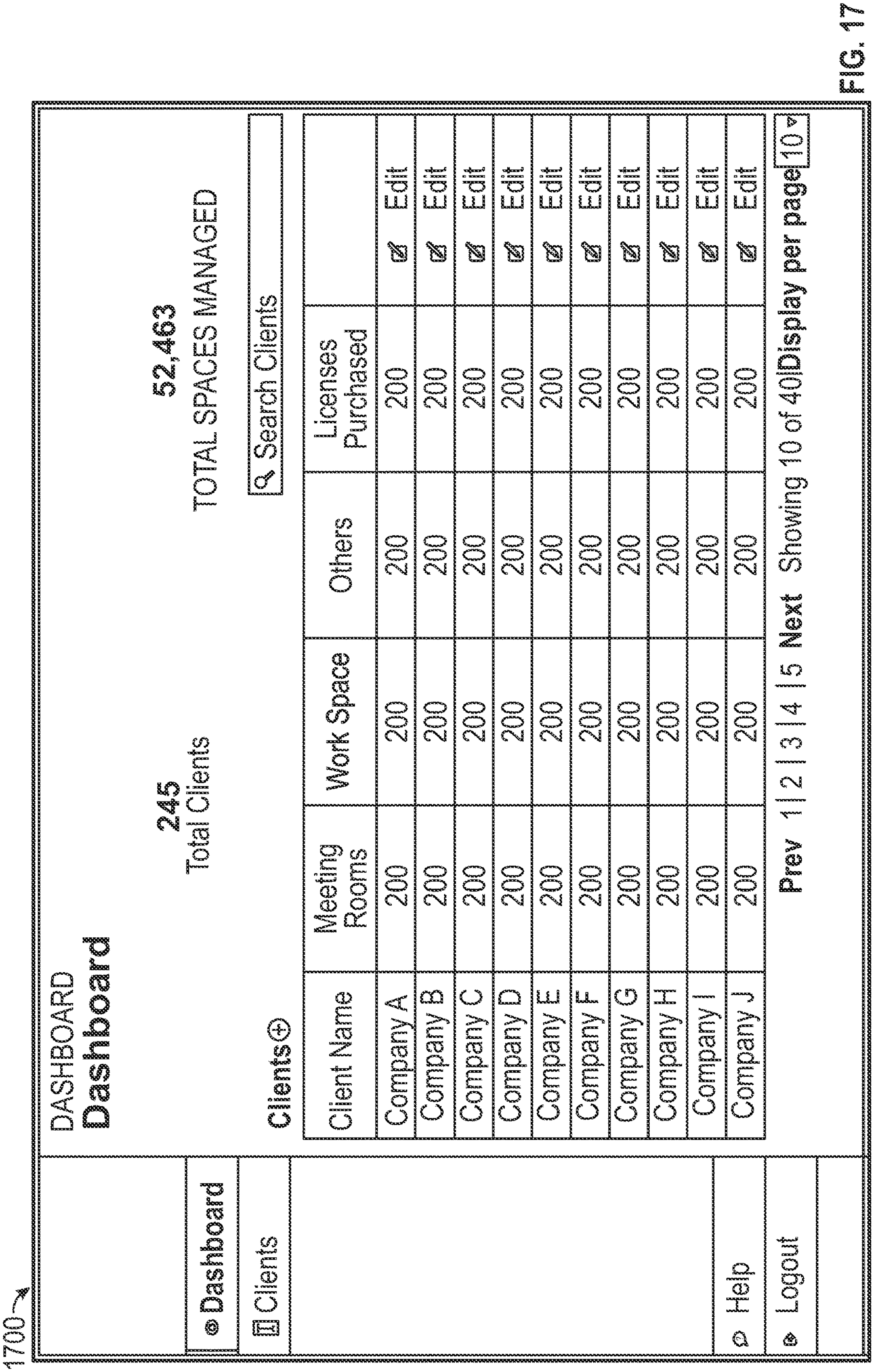

FIG. 17

Dashboard
Clients
Help
Logout

DASHBOARD/ SPACES

Clients ⊕

Search Clients

| Client Name | Meeting Rooms | Work Space | Others | Licenses Purchased | |
|---|---|---|---|---|---|
| Company A | 200 | 200 | 200 | 200 | Edit |
| Company B | 200 | 200 | 200 | 200 | Edit |
| Company C | 200 | 200 | 200 | 200 | Edit |
| Company D | 200 | 200 | 200 | 200 | Edit |
| Company E | 200 | 200 | 200 | 200 | Edit |
| Company F | 200 | 200 | 200 | 200 | Edit |
| Company G | 200 | 200 | 200 | 200 | Edit |
| Company H | 200 | 200 | 200 | 200 | Edit |
| Company I | 200 | 200 | 200 | 200 | Edit |
| Company J | 200 | 200 | 200 | 200 | Edit |

Prev 1 | 2 | 3 | 4 | 5 Next Showing 10 of 40 | Display per page 10

Dashboard
Clients
Help
Logout

HOME / CLIENTS
Client: ACME
Last Modified
Apr 2, 2024 9:21:15 AM EST
Client Name
Contact Name
Contact Phone
Contact Email
Save
Licenses (3)

| Subscription Licenses | Purchased | Used | Remaining | Start Date | End Date |
|---|---|---|---|---|---|
| Meeting Room | 20 | 20 | 0 | 00/00/0000 | 00/00/0000 |
| Workspace | 20 | 20 | 0 | 00/00/0000 | 00/00/0000 |
| Meeting Room | 20 | 20 | 0 | 00/00/0000 | 00/00/0000 |
| Workspace | 20 | 20 | 0 | 00/00/0000 | 00/00/0000 |
| Meeting Room | 20 | 20 | 0 | 00/00/0000 | 00/00/0000 |
| Workspace | 20 | 20 | 0 | 00/00/0000 | 00/00/0000 |
| Other | 20 | 20 | 0 | 00/00/0000 | 00/00/0000 |
| Meeting Room | 20 | 20 | 0 | 00/00/0000 | 00/00/0000 |
| Other | 20 | 20 | 0 | 00/00/0000 | 00/00/0000 |
| Workspace | 20 | 20 | 0 | 00/00/0000 | 00/00/0000 |

Add License

Prev 1 | 2 | 3 | 4 | 5 Next Showing 10 of 40 | Display per page 10 ▾

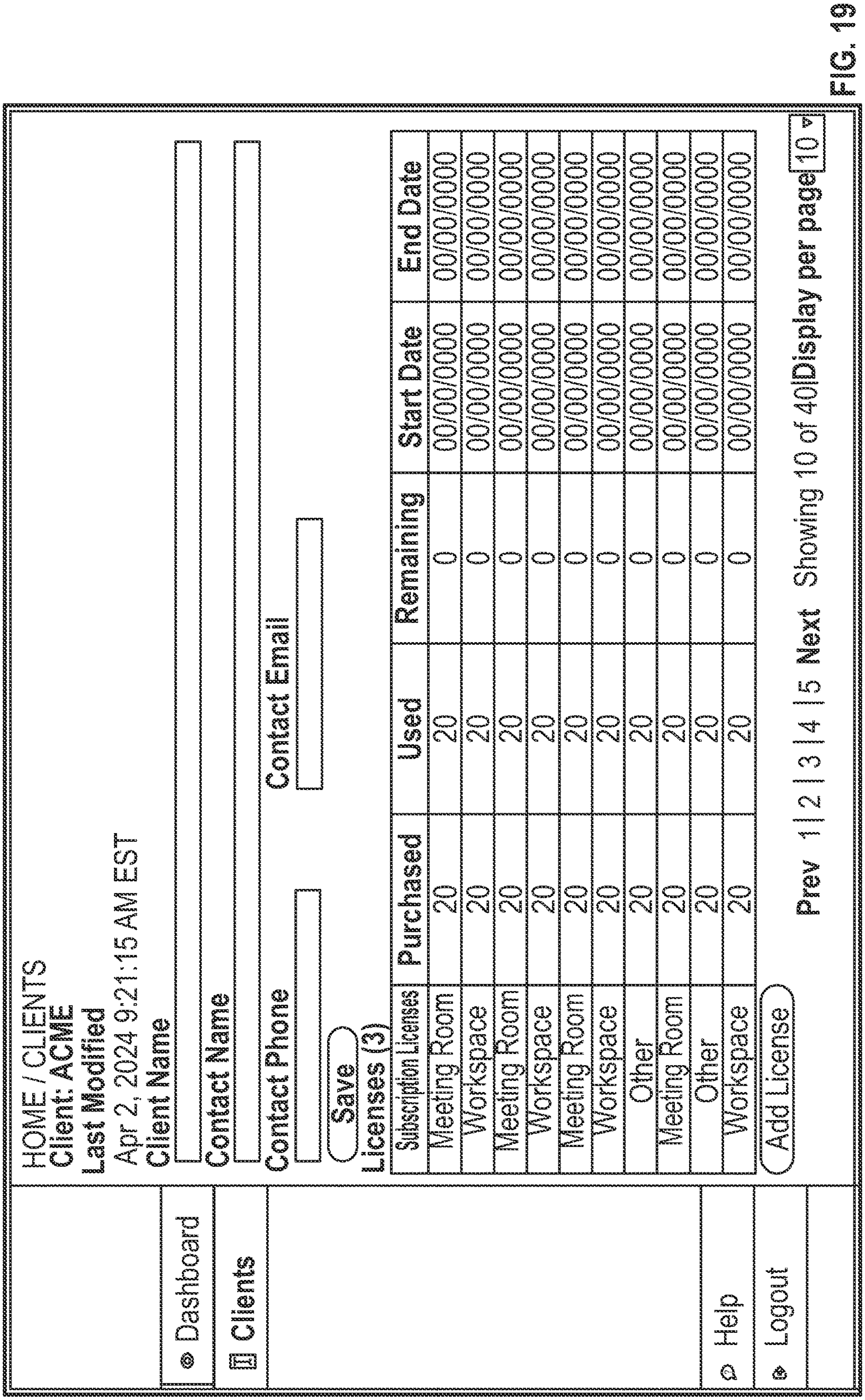

FIG. 19

CLIENTS/ ADD LICENSE

Search Clients

Add License

License Type Meeting Room

Amount Purchased 20

Start Date MM/DD/YYYY

End Date MM/DD/YYYY

Cancel

Add Licenses

Dashboard

Clients

Help

Logout

SYSTEMS AND METHODS FOR BOOKING SHARED SPACES

FIELD OF THE INVENTION

The present invention relates to booking shared spaces using the native camera functionality of a personal electronic device to access and operate a booking engine via a webAR application.

BACKGROUND OF THE INVENTION

The inventions disclosed herein relate to shared space booking systems comprising a booking engine addressable by a web-based augmented reality (webAR) application, and methods for accessing the availability of shared spaces for booking, viewing shared space details and resource information, booking shared spaces, and managing shared space bookings, by using personal electronic devices to access a webAR application and booking engine. In operation, users may immediately book shared spaces without undertaking the cumbersome steps of downloading, installing, and configuring a dedicated software application on a personal electronic device.

Business organizations, institutions of higher learning, hotels and convention centers, government agencies, medical facilities, and similar entities offer shared spaces such as meeting rooms and workspaces (e.g., hoteling offices and hot-desks) to employees and visitors. Users of shared spaces often require the ability to access a shared space's availability, view details about the shared space (including, e.g., available equipment or occupancy limits), book or reserve the shared space for a desired period of time, update or modify existing bookings, and communicate booking information to attendees or third-party services such as calendar applications or email providers.

Traditionally, users wishing to book shared spaces might need to engage in a series of steps such as filling out a physical reservation book or sign-in sheet and communicating with a reservation or reception desk charged with managing bookings. These processes were often slow, prone to errors (such as double-booking), and required dedicated personnel such as receptionists to manage, particularly for large organizations. Over time, users could perform some of these tasks remotely by telephone or e-mail communication, or accessing electronic analogues of physical reservation books and sign-in sheets, but users nevertheless longed for the convenience, flexibility, and control of true self-service solutions.

Presently, there are several solutions available that permit users to access the real-time availability of shared spaces for booking, view shared space details and resource information, and book and modify bookings. But even these modern solutions have significant drawbacks.

For example, current space booking platforms may include software and/or hardware for viewing availability and managing bookings such as room display solutions. Room display solutions include digital, interactive signage (e.g., LED or e-paper) and kiosks. Display solutions are installed on the outside of meeting rooms or in other shared spaces such as in a building lobby, where users can access a space's availability, occupation status, and/or upcoming bookings. An example of such a solution is the Meeting-Minder™ Meeting Room Signs available from Visix, Inc.

Depending on the needs of a given organization, however, there are potential drawbacks to using room display solutions for this purpose. Because interactive display devices are installed in specific locations, a user must be physically present to operate them. This can be inconvenient if the shared space is in a different location or if the user prefers to book the shared space remotely. Additionally, if a room display continuously shows information about the availability of a shared space to the public, sometimes confidential or sensitive information about meetings may be disclosed to unintended recipients, raising privacy and security concerns. Additionally, such displays are often expensive and require accessing facility infrastructure and electricity. Costs associated with room displays for large facilities like hotels or conference centers may require a significant upfront capital investment if signage is required for many spaces, and such systems are difficult to scale up or down once the hardware is purchased or leased. For smaller organizations or facilities, in contrast, such systems may be cost-prohibitive entirely. Further, devices like interactive signs or screens must often be maintained and supported by the provider or other trained IT professionals. And hardware devices may be quickly rendered obsolete due to advances in components or other technology.

Room displays like interactive signs are also frequently found to be not intuitive to intended users, who may not know about the device's interactive features or understand how to operate it without training. These devices also may have limitations such as screen size that prevent the user from interacting with the device effectively. Also, room displays may not communicate details to attendees or integrate with third-party solutions such as a user's calendar or email, limiting the ability of user to efficiently make updates or manage bookings. In such cases, a user must engage in additional steps to import the booking details into the user's own preferred third-party solution, especially if the user does not wish to provide information to the interactive device (e.g., the user's email address) because of privacy or security concerns. This can create challenges in synchronizing room or attendee availability, managing conflicts, or updating bookings across different systems.

Some booking platforms address these concerns by offering a combination of less expensive displays, such as e-paper devices and associated software applications. Because e-paper displays often lack important interactivity features that would permit a user to access a shared space's real-time schedule and create or modify a booking, software applications or scheduling devices used to perform these functions may be provided separately from the displays. For example, a user may access these features via a software program installed on the user's desktop or a dedicated mobile app deployed to the user's personal electronic device. Alternative solutions may not include displays at all, instead relying on other types of devices physically located near a shared space, such as RFID tags or near-field communication transmission devices, that can be used to communicate with, e.g., dedicated mobile apps. But such devices may require explanation or training to enable users to interact with them, or installation of dedicated software. This may limit user adoption, particularly in the context of events open to the general public like conferences.

Separate software like downloadable mobile apps may offer more intuitive user interfaces or GUIs, the ability to securely access and view a shared space's real-time availability and features, the ability to book spaces and manage existing bookings, or integration with a user's preferred email and calendar platforms like Microsoft Outlook.

Examples of booking systems featuring such software programs or mobile apps are offered by Visionect d.o.o., Tactic, Inc., Condeco Group Ltd., Smartway2 Ltd., and others. But these solutions have drawbacks as well.

For example, booking system software, whether integrated with a display or offered as a standalone mobile app for use on a user device, may be subject to additional costs, including subscription and maintenance costs charged to the facility or user, over and above the display costs. The software may also require ongoing support and oversight from the provider or qualified IT personnel, or dedicated onboarding processes to assist users in downloading and accessing the software on desktop or personal electronic devices due to security concerns associated with permitting users to freely install software on such devices.

Dedicated mobile apps, in particular, are a popular offering. Mobile apps may permit a user to remotely check shared space availability, or check-in or identify a space. Dedicated mobile apps also frequently have the benefit of more robust user interfaces and the ability to communicate with back-end systems. But encouraging use of mobile apps is associated with its own challenges.

For example, dedicated mobile apps must be developed to operate on most mass-market personal electronic devices such as smartphones. Apps must be created for different operating systems like iOS and Android by using their respective programming languages (e.g., Java or Kotlin for Android). The complexity that comes with developing and managing mobile apps increases the likelihood that some platforms may not be supported, or older devices and operating systems may not permit full functionality. This limits the pool of available users.

Mobile apps also come with user-associated challenges as well. Users must obtain a dedicated mobile app from an appropriate resource (e.g., typically the App Store for iOS, or Google Play Store for Android) and be able to download and launch it. But a user's personal electronic device may be locked down for security reasons, and the user may not be able to download and install the mobile app, or do so without obtaining assistance from the user's organization's IT professionals. A user's organization may not want a mobile app be added to a discrete set of pre-approved apps, and deny the user permission to download the app. Even if a mobile app is successfully installed, the personal electronic device's operating system may eventually off-load it automatically in the event of infrequent use. A user wishing to use the mobile app must then engage in the frustrating process of locating and re-installing the app, which they may find to be time-consuming and tedious.

In addition to technical issues, users may resist downloading and installing new mobile apps on their personal electronic devices for other reasons, especially if the mobile app is not expected to be frequently used for long. This could significantly adversely affect widespread user adoption. For example, a user may not want to install a "one time" or "single purpose" mobile app, particularly if the user is encountering it for the first time at a conference or other isolated event. A user may also not download a mobile app due to limited storage space on their personal electronic device, or out of a desire not to consume communication, battery, or processing resources. Users also may resist installing "unknown" mobile apps for security and privacy reasons, especially if made available by unfamiliar publishers. Finally, users may simply not be technically-savvy or confident enough to learn how to download and use a new app, and therefore avoid the process.

For all these reasons, a shared space booking system accessible via a user's personal electronic device without the need for downloading and installing a mobile app is desirable. A system that is further operable by the user to view the real-time availability of a shared space, identify resource information associated with the shared space, make and manage bookings, communicate bookings with attendees, and/or integrate with third-party solutions is also desired.

Further, a shared space booking system that is intuitive to users and does not require installation of expensive hardware components at a resource location is desired.

Also, a shared space booking system operable to create and manage bookings, check shared space availability in real-time, communicate booking information to attendees, and integrate with preferred services (such as calendar and email applications), that further permits users to search for shared spaces based on location, capacity and features, and view shared space details such as room layouts in augmented reality, is desired. Additionally, a shared space booking system that performs such functions by operating native hardware and software on a user's personal electronic device, with no need to download and install a dedicated mobile app is also desired.

Further, a shared space booking system that is affordable for all shared spaces—desks, workspaces, meeting rooms, collaboration rooms, parking spaces, etc.—and that eliminates the need for expensive hardware installations at shared space locations is desired.

A shared space booking system enabling a user to identify a shared space and access the shared space booking system by scanning an encoded shared space identifier such as a QR code with the user's personal electronic device's native camera application is desired. Moreover, displaying shared space details such as real time availability by overlaying the details on the native camera screen display or camera feed is desired.

Also, a shared space booking system that significantly lowers the cost of entry and ownership of a space booking platforms by eliminating the need for interactive display devices is desired.

Existing solutions do not provide all these benefits. For example, U.S. Pat. Pub. No. US20190370700A1, assigned to Steelcase, Inc. describes an "alternative room scheduling device" provided via a personal electronic device like a mobile phone. Spaces or rooms can be identified wirelessly via use of NFC, RFID tag, QR or similar code that may be used to uniquely identify the space. A personal electronic device like a smartphone uses this code or linked information to identify a space and retrieve room booking information. A user is then presented with this information and can use either a personal electronic device or a physical room booking system having a display near a room that further includes a rotational dial that a user can use to select times for bookings. Steelcase does not specify with an explanation of how a personal electronic device can be configured to perform these actions except by a user downloading and installing a mobile app.

Unlike platforms that require a user to download, install, and launch a mobile app on the user's personal electronic device to access and operate the shared space booking system, the embodiments described herein detail a new and more efficient way for accessing and operating such a system via a webAR application and booking engine that is likely to be more widely adopted by users not wishing to download and install mobile apps to their personal electronic devices.

Embodiments of the inventions described herein overcome the above-mentioned limitations and others. Other features of the present invention will be apparent to those of ordinary skill in the art in light of this disclosure.

SUMMARY OF THE INVENTION

One aspect of an embodiment disclosed herein comprises a shared space booking system, accessible via a personal electronic device having a camera for displaying a camera feed and scanning an encoded shared space identifier (e.g., a QR code), wherein the shared space booking system comprises a web-based augmented reality application operable by the personal electronic device to retrieve real-time booking information from a booking engine and display the booking information as visual objects overlaid on the camera feed to create an augmented reality experience. The booking information or booking data may comprise interactive booking options, such as a scheduler, selectable by a user to create a new booking or modify an existing booking. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

Another aspect of an embodiment disclosed herein includes a shared space booking system having a booking engine having a central processing unit and a communication transceiver that aggregates, via a web-based augmented reality (webAR) application, over a network, a shared space booking parameter from a personal electronic device, and shared space availability from a calendar system, where the booking engine stores shared space bookings in a non-transitory storage medium may include a booking database; an interactive augmented reality user interface distributed to the personal electronic device by the webAR application and displayed on the personal electronic device, operable by a user to select a shared space booking parameter; and the webAR application, upon receiving the shared space booking parameter, generates a query prompting the booking engine to compare the shared space booking parameter to the shared space availability in the booking database and provide a query response, and upon receiving the query response updates the interactive augmented reality user interface with the query response. Other embodiments of this aspect include corresponding computer systems, apparatus, and computer programs recorded on one or more computer storage devices, each configured to perform the actions of the methods.

A further aspect of an embodiment disclosed herein includes a computer-implemented method for shared space booking via a web-based augmented reality (webAR) application. The computer-implemented method also includes scanning, by a camera of a personal electronic device, a shared space identifier, where the shared space identifier is associated with a shared space and may include a link to a webAR application; opening the link to the webAR application and establishing a connection between the personal electronic device and the webAR application; receiving, by the personal electronic device, an interactive augmented reality user interface from the webAR application for display on the personal electronic device, where the interactive augmented reality user interface may include a shared space booking parameter selector; displaying the interactive augmented reality user interface on a display associated with the personal electronic device; receiving, by the webAR application, a shared space booking parameter selected using the shared space booking parameter selector, and generating a booking query may include the shared space booking parameter; processing, by a booking engine, the booking query by the webAR application by comparing the shared space booking parameter to shared space information stored in a non-transitory computer readable storage medium may include space booking database, and generating a query response; and providing a virtual object representing the query response to be displayed on the interactive augmented reality user interface. Other embodiments of this aspect include corresponding computer systems, apparatus, and computer programs recorded on one or more computer storage devices, each configured to perform the actions of the methods.

Yet another aspect of an embodiment disclosed herein includes a computer-implemented method for identifying information about a shared space that may include the further steps of scanning a shared space identifier associated with a shared space by a camera of a personal electronic device, where the personal electronic device further may include a display; displaying, on the display of the personal electronic device, a camera feed; decoding the shared space identifier and triggering a web-based augmented reality (webAR) application; querying a booking database for shared space information associated with the shared space; delivering to the personal electronic device by the webAR application a first virtual object representing the shared space information; and displaying the first virtual object in combination with the camera feed on the display. Other embodiments of this aspect include corresponding computer systems, apparatus, and computer programs recorded on one or more computer storage devices, each configured to perform the actions of the methods.

A further aspect of an embodiment disclosed herein includes a computer-implemented shared space booking system having a personal electronic device may include a camera and a display that generates a camera feed and displays the camera feed on the display; an interactive augmented reality user interface generated by a web-based augmented reality (webAR) application, the interactive augmented reality user interface may include a first virtual object associated with a shared space and a shared space booking parameter menu operable by a user to select a shared space booking parameter (the first virtual object may include one or more of a booking availability, a scheduled booking in the shared space; a 3d rendering of the shared space; a 2d rendering of the shared space; a floor plan; a capacity of the shared space; a shared space name; a shared space type; and a shared space location, a 3D object, a texture, or a lighting effect, and the shared space booking parameter may include one or more of a date; a time; a duration; a shared space location; a shared space resource; a capacity of the shared space; a booking name; a shared space name; a shared space type; and a personal identification number); the webAR application in response to receiving a shared space booking parameter generates a query may include the shared space booking parameter for processing by a booking engine; the booking engine may include a central processing unit and a communication transceiver that aggregates shared space information in a booking database stored in a non-transitory memory, where the booking engine, in response to receiving the query may include the shared space booking parameter from the webAR application, compares the shared space booking parameter to space booking data in the booking database and generates a query response; and where the webAR application in response to receiving the query response from the booking engine and generates and displays a second virtual object may include the query response for display on the interactive augmented reality user interface. Additional steps may include accessing, by the webAR application, the camera of the personal electronic device; generating a camera feed and displaying the camera feed on a display of the personal electronic device; delivering, by the webAR application, a first virtual object to the personal electronic device; displaying the first virtual object in combination with the camera feed on the display; receiving, by the webAR application, a shared space booking parameter associated with the shared space; generating a query may include the shared space booking parameter, and communicating the query to the booking engine; comparing, by the booking engine, the shared space booking parameter to shared space information stored in a booking database, and generating a query response; receiving, by the webAR application, the query response; delivering, by the webAR application, a second virtual object to the personal electronic device based upon the query response; and displaying the second virtual object in combination with the camera feed on the display (the second virtual object may represent a booking availability for the shared space; receiving, by the webAR application, a booking request for the shared space; recording a booking in the booking database; receiving, by the webAR application, a booking modification request; communicating the booking modification request to the booking engine; modifying the booking stored in the booking database; delivering instructions to a calendar application to update a calendar with the booking; delivering, by the webAR application, a third virtual object representing a modified booking; receiving a payment associated with the booking; displaying gyroscope and accelerometer data from the personal electronic device with the camera feed on the display; recognizing and tracking, by the webAR application, a visual marker in the camera feed; optimizing by the webAR application, which may include one or more of occlusion culling; pose estimation; efficient rendering; level-of-detail management; and frame rate optimization; virtually anchoring, by the webAR application, the first virtual object to a real-world surface represented in the camera feed. Implementations of the described techniques may include hardware, a method or process, or computer software on a computer-accessible medium.

In another aspect of an embodiment disclosed herein, a computer-implemented method for booking a shared physical asset via a personal electronic device may include a camera in communication with a web-based augmented reality (webAR) application and booking engine is disclosed, including the steps of accessing, by the webAR application, the camera of the personal electronic device; generating a camera feed and displaying the camera feed on a display of the personal electronic device; delivering, by the webAR application, a first virtual object to the personal electronic device; displaying the first virtual object in combination with the camera feed on the display; modifying, by the webAR application, the first virtual object associated with a shared physical asset; receiving, by the webAR application, a shared physical asset booking parameter associated with the shared physical asset; generating a query may include the shared physical asset booking parameter, and communicating the query to a booking engine; comparing, by the booking engine, the shared physical asset booking parameter to shared physical asset booking data stored in a booking database, and generating a query response; receiving, by the webAR application, the query response; delivering, by the webAR application, a second virtual object to the personal electronic device based upon the query response; and displaying the second virtual object in combination with the camera feed on the display. The shared physical asset may be equipment, furniture, a parking space or other shared asset. Other embodiments of this aspect include corresponding computer systems, apparatus, and computer programs recorded on one or more computer storage devices, each configured to perform the actions of the methods.

BRIEF DESCRIPTION OF DRAWINGS

The invention is disclosed with reference to the accompanying drawings, wherein:

FIGS. 4-20 are exemplary screens of a user interface for performing administrative tasks using back-end application server components according to an embodiment of the inventions disclosed herein.

Corresponding reference characters indicate corresponding parts throughout the several views. The examples set out herein illustrate several embodiments of the invention but should not be construed as limiting the scope of the invention in any manner.

DETAILED DESCRIPTION OF THE INVENTION

It is to be understood that the figures and descriptions of the present invention have been simplified to illustrate elements that are relevant for a clear understanding of the present invention, while eliminating, for the purpose of clarity, many other elements found in typical computer systems and methods for processing of data relating to shared space booking and operation of reservation booking systems. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein.

Figure 1:
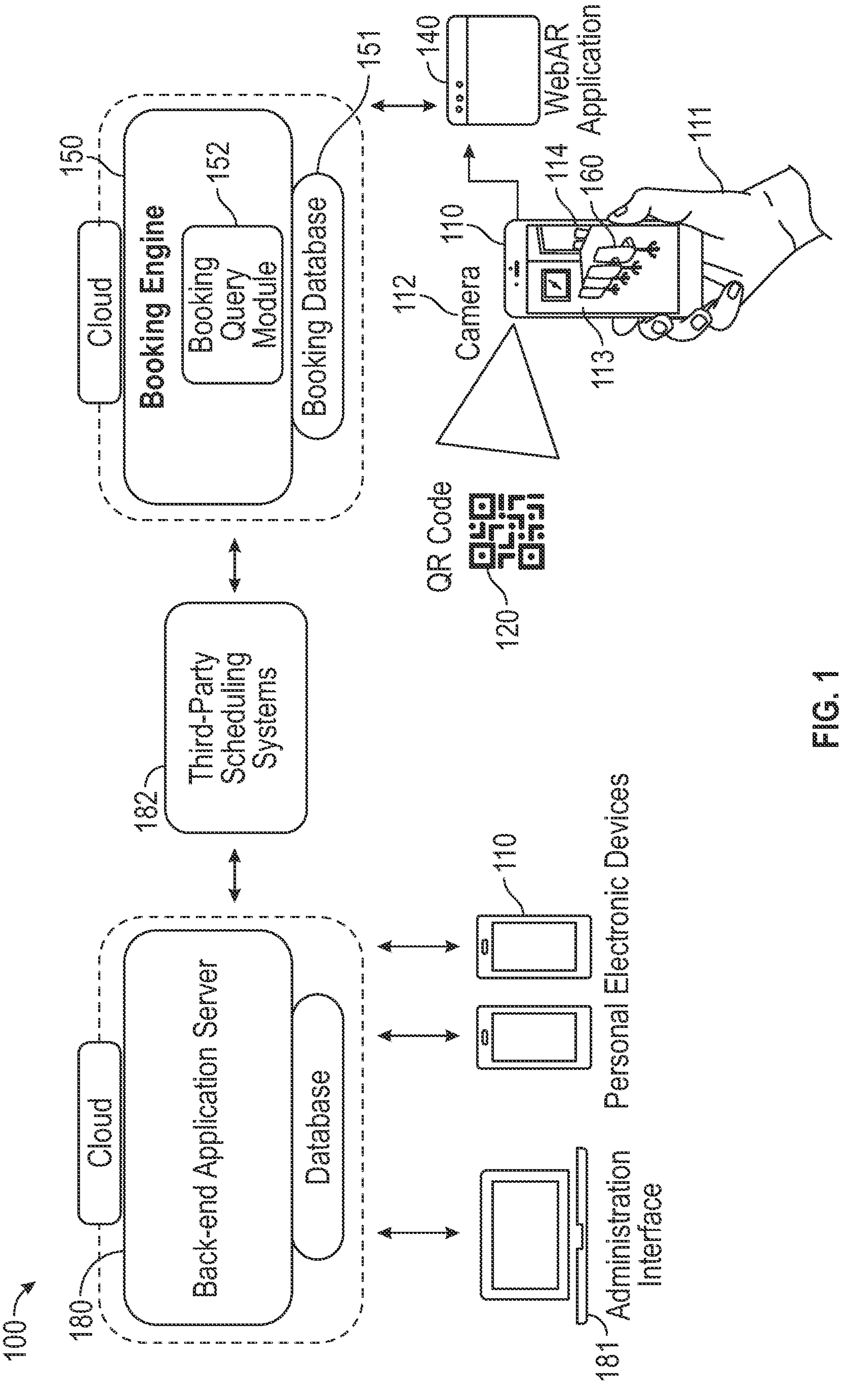
FIG. 1 is a schematic illustration of a shared space booking system according to an embodiment of the inventions disclosed herein.

FIG. 1 is a schematic of a shared space booking system 100 according to an embodiment of the inventions described herein. Shared space booking system 100 is a computer-implemented system configured to receive and store scheduling and other data related to shared space bookings. Shared space booking system 100 is accessible by one or more personal electronic devices 110. Personal electronic device 110 may be a smartphone or similar mobile device operated by user 111. Personal electronic device 110 comprises an operating system such as iOS (offered on mobile devices manufactured by Apple, Inc.) or Android (offered on mobile devices by a variety of manufacturers). Personal electronic device 110 further comprises camera 112 and associated camera software for generating and displaying live camera feed 113 via the display 114 of personal electronic device 110, or other means. Display 114 may be a screen integrated in the body of personal electronic device 110, or a personal electronic device or display viewable by user 111. Camera feed 113 is an image of the current environment viewable by camera 112. Camera 112 may be native hardware and software components provided with personal electronic device 110 by the original manufacturer. Camera 112 is operable to scan shared space identifier 120. Shared space identifier 120 may be a symbol, code or other identifier associated with a shared space. In one embodiment, shared space identifier 120 is a QR code. Shared space identifier 120 may comprise encoded information (such a URL encoded in a QR code). Camera 112 and associated camera software is operable to scan, decode and extract information or data from shared space identifier 120 about a shared space. Shared space identifier 120 may be physically located at or near the entrance of a shared space. In some embodiments, shared space identifier 120 may be located in a central index of shared spaces, or a map of shared spaces, or other collection of space identifiers 120.

Shared space identifier 120 may comprise, e.g., a URL, QR code, or NFC tag. Shared space identifier 120 may further comprise a link that when scanned by camera 112 triggers or otherwise launches webAR application 140 over a network. Network may be, or include, wired or wireless local area networks and wide area networks, and over communications between networks, including over the Internet. Any suitable data and communication protocols may be employed. webAR application 140 is configured to deliver augmented reality elements such as virtual objects through, e.g., the native web browser of personal electronic device 110 or overlaid on live camera feed 113 generated by camera 112, without the need for user 111 to locate, download, and install a dedicated mobile app before experiencing the augmented reality elements. In one embodiment, user 111 may be prompted to permit webAR application 140 to access camera 112, which may be declined or granted. webAR application 140 receives data from personal electronic device 110, e.g., data associated with shared space identifier 120, such as, for example, QR code data scanned and decoded by camera 112, webAR application 140 may extract relevant information from the data associated with shared space identifier 120, by, e.g., parsing the data payload and identifying any parameters that may be used by webAR application 140 (or a webAR application server, not shown) to generate queries to booking engine 150. Queries may be generated, for example, to determine booking availability or existing booking details for a shared space. Booking engine 150 comprises a processor and communication transceiver. As used herein, the term "processor" broadly refers to and is not limited to a single- or multi-core general purpose processor, a special purpose processor, a conventional processor, a Graphics Processing Unit (GPU), a digital signal processor (DSP), a plurality of microprocessors, one or more microprocessors in association with a DSP core, a controller, a microcontroller, one or more Application Specific Integrated Circuits (ASICs), one or more Field Programmable Gate Array (FPGA) circuits, any other type of integrated circuit (IC), a system-on-a-chip (SOC), and/or a state machine. Once responses to the queries are received by webAR application 140 from booking engine 150, webAR application 140 may generate, locate and/or deliver to personal electronic device 110 a message, visual placard, photos, videos, filters, or other virtual object viewable by user 111 on display 114. In one example, webAR application 140 delivers a visual placard indicating whether or not a shared space associated with shared space identifier 120 is available for booking. In another example, webAR application 140 delivers a 3D virtual object representing booking availability to personal electronic device 110 for display in combination with or overlaid on a live camera feed. Web technologies, such as HTML, CSS, and JavaScript, and AR frameworks, such as AR.js and A-Frame, may be used with webAR application 140 to deliver augmented reality elements.

In another embodiment, webAR application 140 receives shared space booking parameters from user 111 and generates queries to booking engine 150 concerning a shared space or others. webAR application 140 receives responses to queries from booking engine 150 and delivers virtual objects 160 based upon the responses. Virtual objects may be stored in a cloud-based content management system for retrieval by webAR application 140. webAR application 140 provides virtual objects 160 to personal electronic device 110 for display, for example, in combination with or overlaid upon camera feed 113. User 111, viewing the combination of camera feed 113 and virtual objects 160 on display 114, experiences augmented reality.

In one embodiment, webAR application 140 uses Web Extended Reality (WebXR) and Web Graphics Library (WebGL) technologies to render virtual objects 160. webAR application 140 displays virtual objects 160 in combination with camera feed 113 to create an augmented reality experience for user 111. webAR application 140 may further enable user 111 to interact with virtual objects 160, to make selections. Once user 111 starts camera feed 113, for example, a 3D scene delivered by webAR application 140 will be activated, which is synced with camera 112's position in an environment.

WebAR application 140 may be triggered by personal electronic device 110 following decoding of a shared space identifier 120, or webAR application 140 may also be markerless, attached to geolocation, and hidden in a direct link.

Using webAR application 140 to perform the functions described herein has several advantages over downloadable mobile apps that may be configured to provide scheduling or space reservation functionality. The ease and speed of access to webAR application 140 functions by user 111 (who need only point camera 112 toward shared space identifier 120) significantly outpaces the time required to locate, download, and install a dedicated mobile app. Using webAR application 140 to perform the described functions also permits cross-platform compatibility (e.g., multiple operating systems or brands of personal electronic devices 110) for a larger group of potential users 111 as compared to downloadable mobile apps, since downloadable mobile apps need be specially developed to be compatible with different types of personal electronic device 110, different operating systems, or older hardware components or software applications. webAR application 140 can be launched in the same fashion by different types of personal electronic devices 110 or operating systems, as long as they have a compatible native web browser and minimum hardware capabilities, as known to those skilled in the art, such as a gyroscope accelerometer and a camera sensor. webAR application 140 allows shared space booking system 100 to be used by a potentially wider audience of users 111 than dedicated mobile apps, since some users 111 may be reluctant to download and install a mobile app for one or more of the reasons detailed above, or other reasons.

Figure 2A:
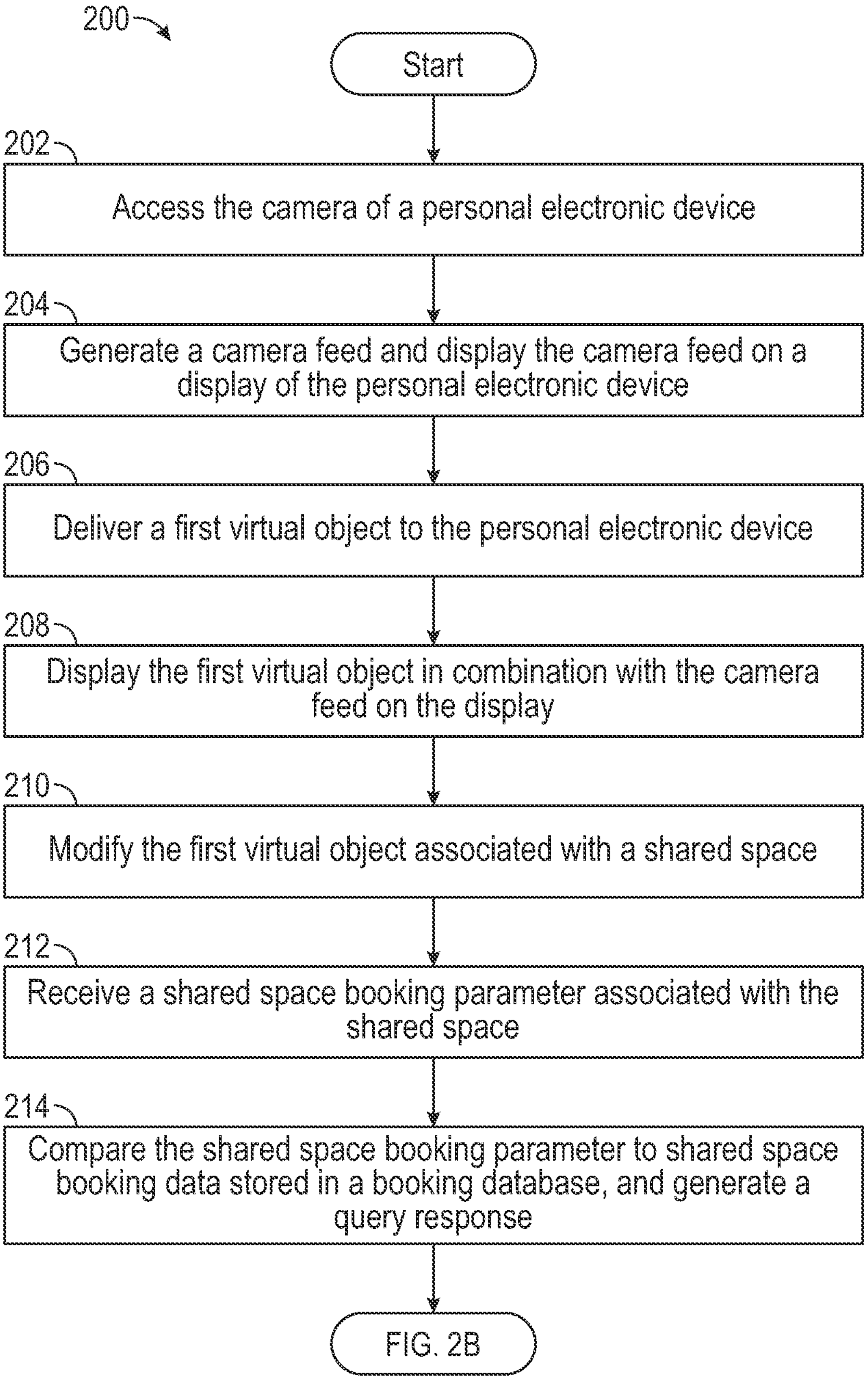
FIGS. 2A and 2B are a process flow diagram of booking query steps performed by the shared space booking system according to an embodiment of the inventions disclosed herein.
Figure 2B:
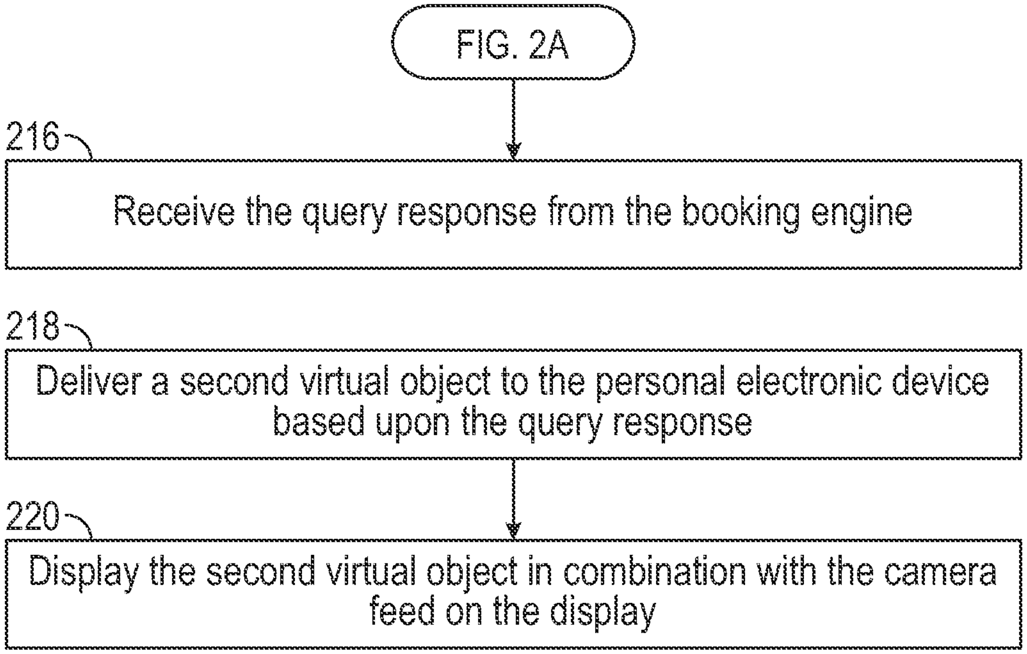

In the method steps 200 detailed in FIG. 2, webAR application 140 generates an augmented reality experience viewable by user 111 by performing the steps of: detecting a browser on personal electronic device 110; verifying the browser supports WebXR and in some embodiments, related technologies used to generate augmented reality content such as WebGL; accessing 202 personal electronic device 110 capabilities such as camera 112, which comprises a camera sensor and associated software, and generating 204 camera feed 113 via, e.g., Web Real-Time Communication (WebRTC) technology, or through web APIs to display camera feed 113 captured by camera 112; delivering 206 virtual objects to the personal electronic device and combining 208 camera feed 113 with virtual objects 160 using computer vision or other techniques known to skilled artisans. In some embodiments, webAR application 140 further combines virtual objects 160 and camera feed 113 with other data (e.g., gyroscope and accelerometer data) collected by personal electronic device 110 in order to track user 111's movements. Mapping virtual objects 160 may further include the steps of recognizing and tracking visual markers, surfaces, or other features in camera feed 113 to determine the position and orientation of personal electronic device 110. WebGL technology may be used to render three-dimensional graphics, textures, lighting effects, and other visual elements for virtual objects 160. Virtual objects 160 may include, e.g., shared space layouts or floorplans, or available resources such as furniture like tables and chairs.

In some embodiments, webAR application 140 performs further optimization steps comprising techniques such as occlusion culling to ensure that virtual objects are properly occluded by real-world objects; pose estimation to determine the position and orientation of personal electronic device 110 relative to the environment; efficient rendering; level-of-detail management; and frame rate optimization to maintain a consistent experience for user 111. Other optimization techniques may be employed as known by skilled artisans. Once virtual objects 160 are positioned, webAR application 140 may virtually anchor them onto real-world surfaces represented in camera feed 113.

Once augmented reality elements are rendered and displayed, webAR application 140 may provide users 111 the ability to interact with and manipulate virtual objects 160 via an interactive augmented reality user interface, including by modifying the content following inputs by user 111, including via gestures, touch inputs, or voice commands captured by personal electronic device 110's input components (e.g., touchscreen, microphone, etc.). For example, user 111 can provide inputs such as touch gestures to select and manipulate virtual objects 160 representing furniture (such as a conference table) and webAR application 140 updates or modifies 210 virtual objects 160 accordingly to represent moving the virtual table around the space, rotating, or adjusting relative size compared to the environment in real time.

WebAR application 140 may further deliver menus of shared space booking parameters representing data of interest to user 111 to be used to generate queries and interrogate booking engine 150. For example, if user 111 is interested in the availability of a shared space on a selected date at desired time, or with certain resources or features, user 111 may select, using a booking parameter selector, from a virtual object 160 representing a calendar. webAR application 140 receives inputs 212 by user 111 representing shared space booking parameters desired date and time, and generates queries to be communicated, e.g., via API or other channel, to booking engine 150. Booking engine 150, utilizing booking query module 152, processes and compares 214 shared space information stored in booking database 151 to the shared space booking parameters or other request specified in the queries, evaluates availability for the shared space, and generates results. In some embodiments, booking engine 150 determines availability by comparing the shared space booking parameters to, e.g., existing bookings, weekends or holidays, scheduled facility closures, or any other constraints defined in the system and stored in a booking database 151. Booking database 151 may include data stored in local data storage devices associated with booking engine 150, data storage devices in communication via a network, e.g. local area network (LAN) or wide area network (WAN), or data stored in one or more third-party data storage devices (not shown) accessible employing the cloud. Storage devices may include suitable non-transitory computer-readable media, such as optical or magnetic disks, fixed disks with magnetic storage (hard drives), flash memory, tapes accessed by tape drives, and other storage media. Storage devices are configured to exchange data with booking engine 150, and may store programs containing processor-executable instructions. Booking engine 150 is configured to access data from storage devices, which may include connecting to storage devices and obtaining data or reading data from the storage devices, or storing new and updated data into the storage devices. Storage devices may include local and network accessible mass storage devices. Storage devices may include mass storage devices.

Once the query is processed, booking engine 150 then generates a response and communicates it webAR application 140, which receives the query response 216 in turn delivers 218 a virtual object 160 representing a notification indicating whether a shared space is available to be booked and displays 220 the virtual object on the display, and provides user 111 the ability to book the space by manipulating a virtual object 160. webAR application 140 receives user 111's booking request and communicates booking details to booking engine 150. Booking engine 150 may in turn prompt integrated third-party calendar systems to, e.g., update user 111's calendar, generate a confirmation e-mail, or notify attendees.

In another embodiment, webAR application 140 receives an input by user 111 seeking to modify or cancel a shared space booking. webAR application 140 generates queries to booking engine 150, much in the same way as above, prompting booking engine 150 to access and compare the requested shared space booking parameters with shared space booking information stored in booking database 151. webAR application 140 may generate queries requesting reservation details from booking engine 150 for display to user 111. webAR application 140 may provide further virtual objects 160 to enable user 111 to view additional details about a booking in real time.

In one embodiment, user 111 may be presented, by webAR application 140, with a placard indicating a shared space is available, and/or one or more shared space booking parameters to review or from which to select to request information about a particular shared space, including: the next scheduled bookings in the space; preview a simulated 3D rendering of the space to see people, capacity, and available resources; view a floor plan; book the space; find other available spaces; enter booking name for the space; select a start time and duration for booking the space; enter a 4-digit PIN to protect booking; and use PIN to cancel, extend or end booking. If a shared space is determined by booking engine 150 to be unavailable for booking, an alternate shared space booking parameter menu offering to find other spaces may be presented to user 111 by webAR application 140. In some embodiments, user 111 may access additional information about a shared space or its resources via webAR application 140, e.g., "how-to" videos for operating AV resources located in a shared space.

In alternate embodiments, shared space booking system 100 may be used to book or otherwise reserve shared physical assets, e.g., physical resources or equipment, or parking spaces. Like shared spaces, such shared physical assets may be assigned a shared asset identifier, analogous to shared space identifier 120, and when decoded, trigger webAR application 140 to perform the steps described above but with respect to the shared physical assets, including by selecting and searching shared physical asset booking parameters.

Other embodiments of shared space booking system 100 include payment card industry (PCI) support for shared spaces or physical assets requiring one-time or recurring payments to book, or to charge late fees for failing to timely vacate a shared space or return a shared physical asset.

Turning back now to FIG. 1, shared space booking system 100 further comprises back-end application server 180. Back-end application server 180 enables administrators, using administration interface 181, to configure properties associated with shared spaces such as names, locations and other shared space information, and provide configurable data to third-party services such as third-party scheduling systems 182, as may be commonly associated with space booking and calendaring. Back-end application server 180 may communicate with such third-party scheduling systems by API or similar connections.

Figure 3:
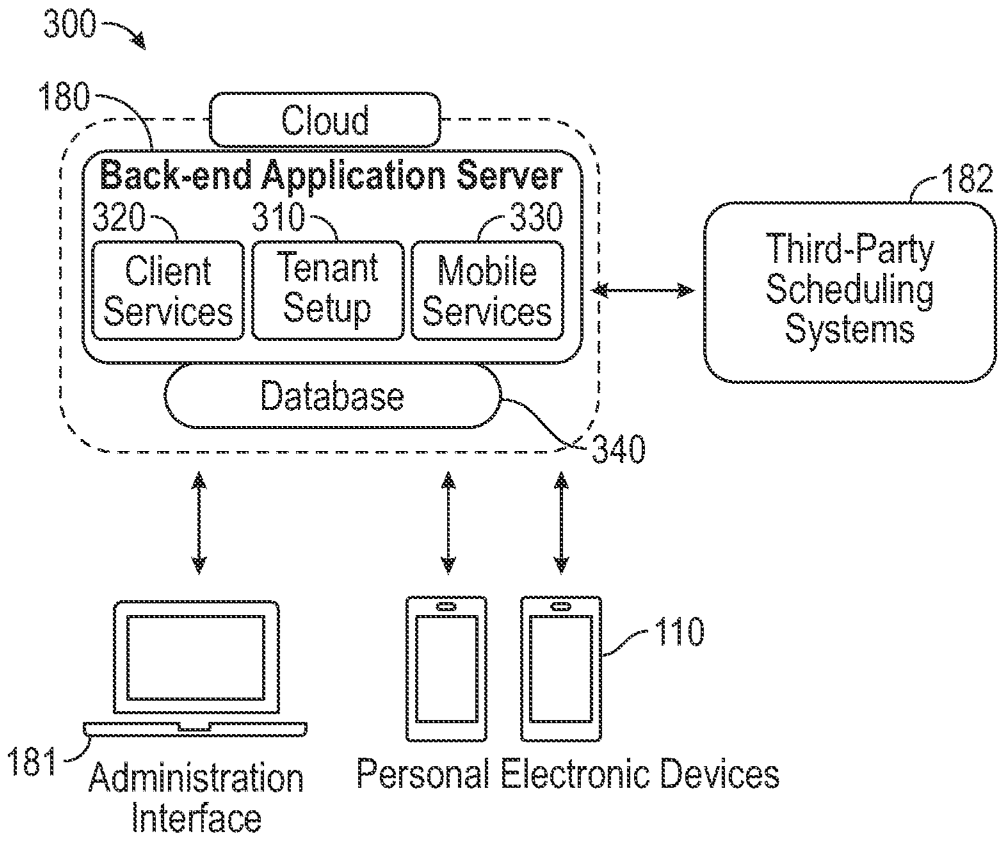
FIG. 3 is an illustration of a back-end application server and related components of a shared space booking system according to an embodiment of the inventions disclosed herein.

As shown in FIG. 3, back-end administration system 300 is shown comprising back-end application server 180, which in one embodiment, is a multi-tenant, cloud-hosted, software-as-a-service solution accessible by administrators via administration interface 181. Using tenant setup module 310, for example, administrators may perform new organization set-up tasks, such as first identifying each bookable shared space, manage licenses, manage and configure bookable spaces, add and configure scheduling system or asset management application connections; manage users; allocate shared spaces to applicable organizational structures; and perform other administrative tasks. In one embodiment, back-end application server 180 is also operable to generate space identifiers 120 for each a shared space, such as unique URLs and/or QR codes. In an alternate embodiment, back-end application server 180 receives user organization custom URLs or QR codes and assigns them as space identifiers 120 for shared spaces. Back-end application server 180 may further comprise client service module 320 and mobile services module 330, and store administrative information concerning system configuration in associated database 340.

Turning now to FIGS. 4-20, a series of exemplary screens accessible by administrators (and clients) via a web-based interface are provided.

FIG. 4, for example, provides a rendering of dashboard 400. Dashboard 400 provides a visual summary of an organization's instance of shared space booking system 100. Dashboard 400 may identify, for example, the total number of shared spaces, and total system views within a defined period. Dashboard 400 may further list the most active shared spaces 410 (the shared spaces reserved the most), the recent bookings 420, and the shared space identifiers viewed the most within a defined period. Dashboard 400 may also provide license summary information 430, including the number of licenses purchased, used, and remaining, and each license's start and end dates.

FIG. 5 provides a shared spaces manager 500, which identifies shared spaces by name and type, and permits administrators to add, edit, copy, and delete shared spaces displayed in the context of long lists that can be searched. Identifying shared spaces in long lists as shown improves administrator efficiency by limiting scrolling back and forth through numerous screens.

Figure 6:
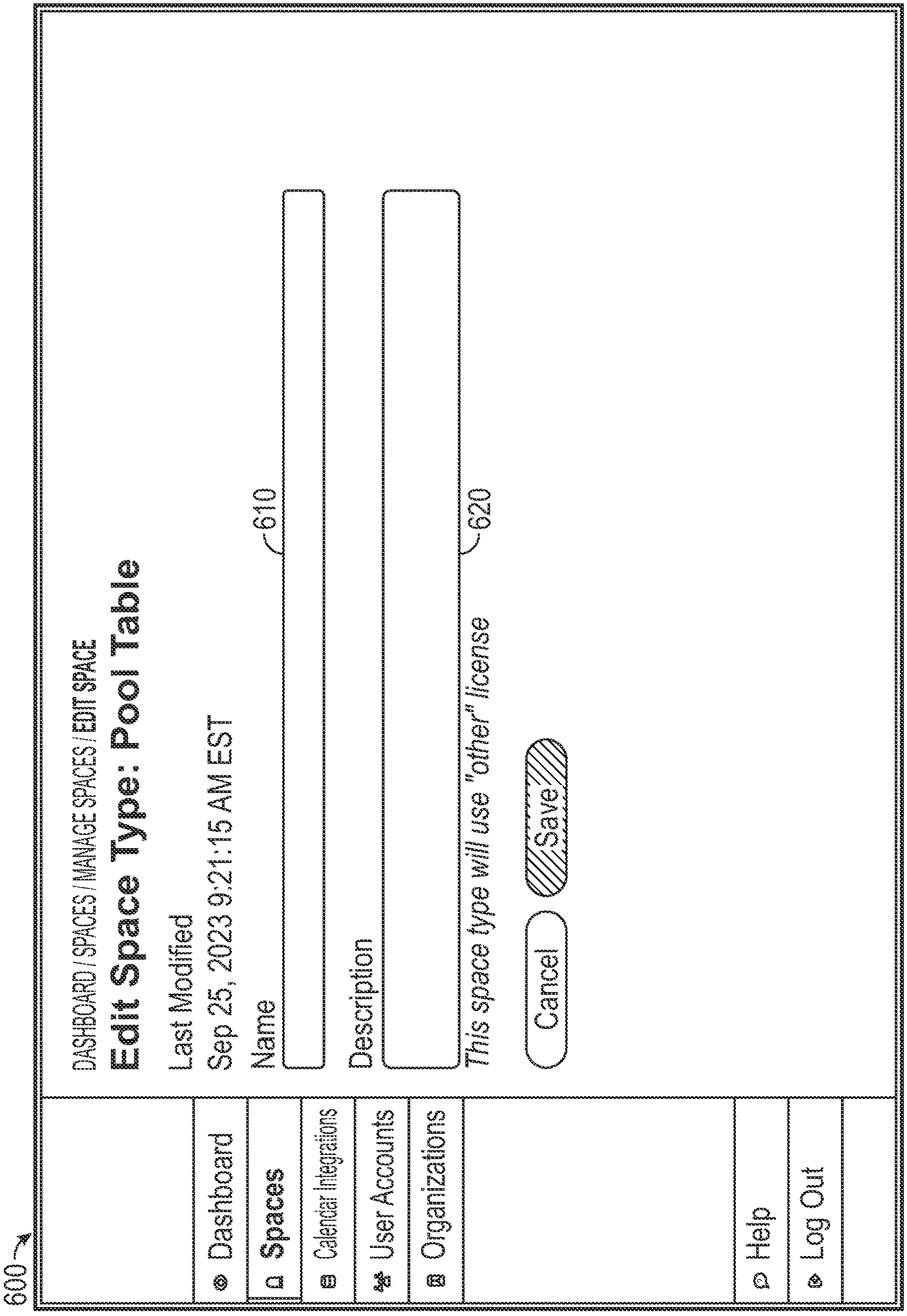

FIG. 6 illustrates shared space type editor 600. Shared space type editor 600 enables administrators to modify details associated with space types, including shared space name field 610. Optional description field 620 can be used to describe the shared space in detail.

FIG. 7 provides shared space type manager 700, where shared space types can be added, managed, copied and deleted.

Figure 8:
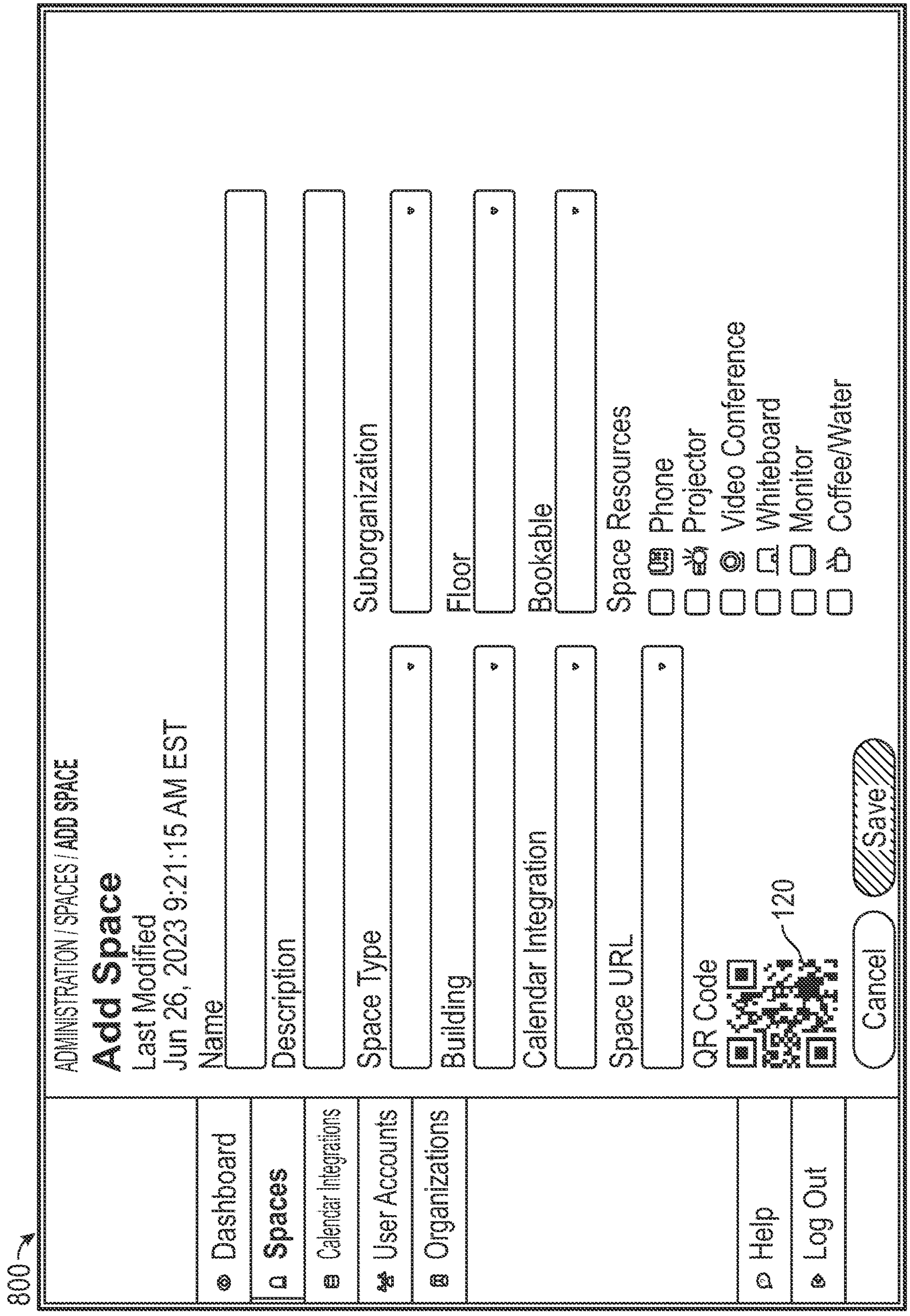

FIG. 8 shows add shared space form 800, usable to add and define shared spaces. Shared space form 800 may provide fields to identify a shared space name and provide an optional detailed description, and a dropdown list to associate a shared space with a predefined shared space category. Additional details may be provided including shared space availability, with associated parameters, which may be managed by a calendar integration and a unique URL associated with the shared space. Once the various fields are completed, a shared space identifier 120, here, a QR code, which is unique to the shared space, is generated. Shared space identifier 120 may be optionally downloaded for use by printing and displaying shared space identifier 120 at or near the location of the shared space.

Figure 9:
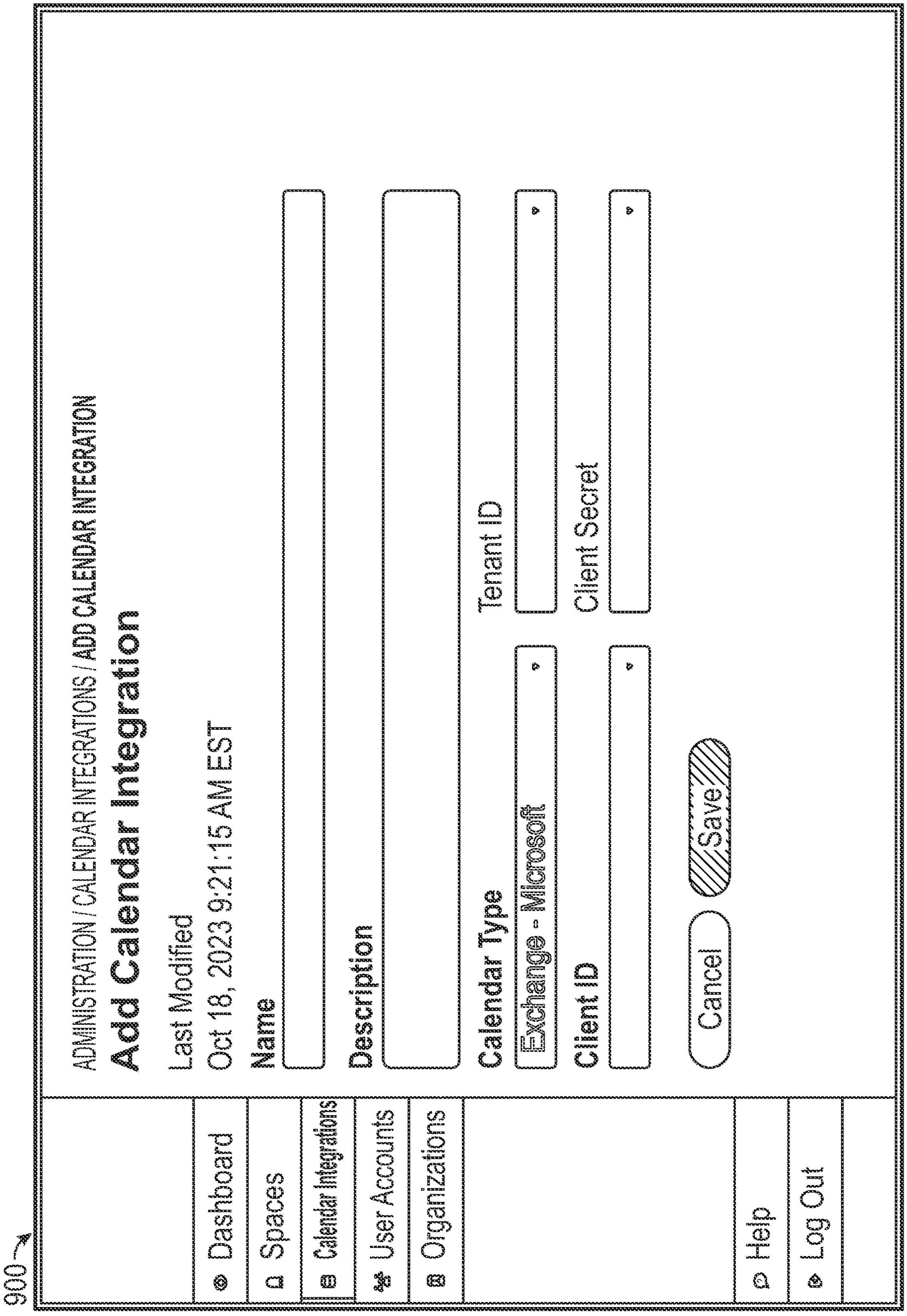

FIG. 9 provides calendar integration interface 900, usable to enable calendar connections and provide users 111 with an interface to configure connections such as APIs. Calendar integration interface 900 may include fields used to name a new calendar integration and add additional optional description. A new calendar integration may further be associated with one of a predefined list of calendar integration types. A tenant identification field may also be provided that defines the address of the calendar by its associated URL. Additionally, fields for inputting access credentials in the form of a Client ID (user name) and Client Secret (password) are provided to ensure the calendar is reachable.

FIG. 10 provides calendar integrations list 1000, describing existing calendar integrations (e.g., Office 365, Google Calendar, AgilQuest, 25 Live, etc.) and offers options for adding, managing, copying, and deleting calendar integrations.

Figure 11:
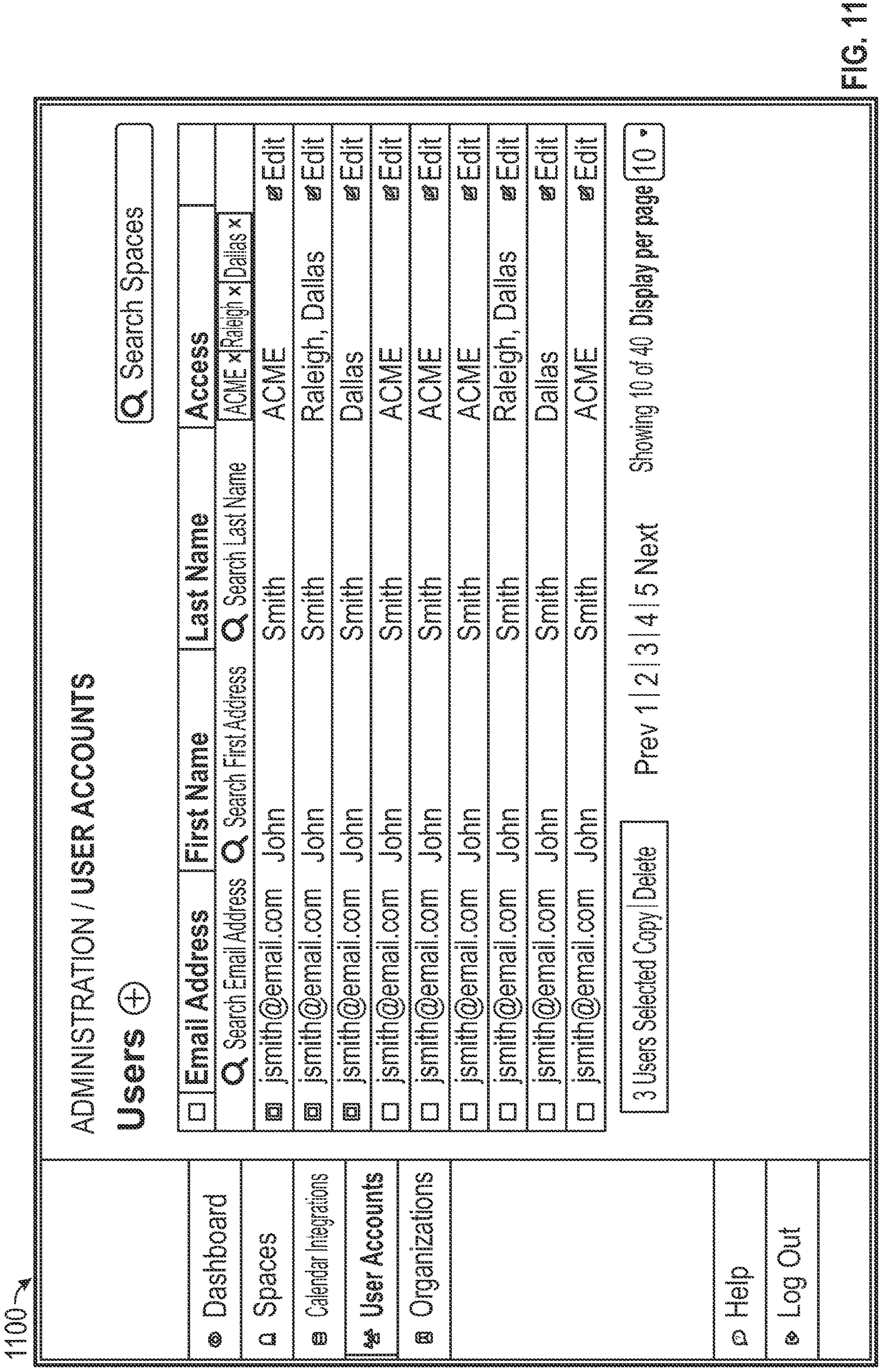
Figure 16:
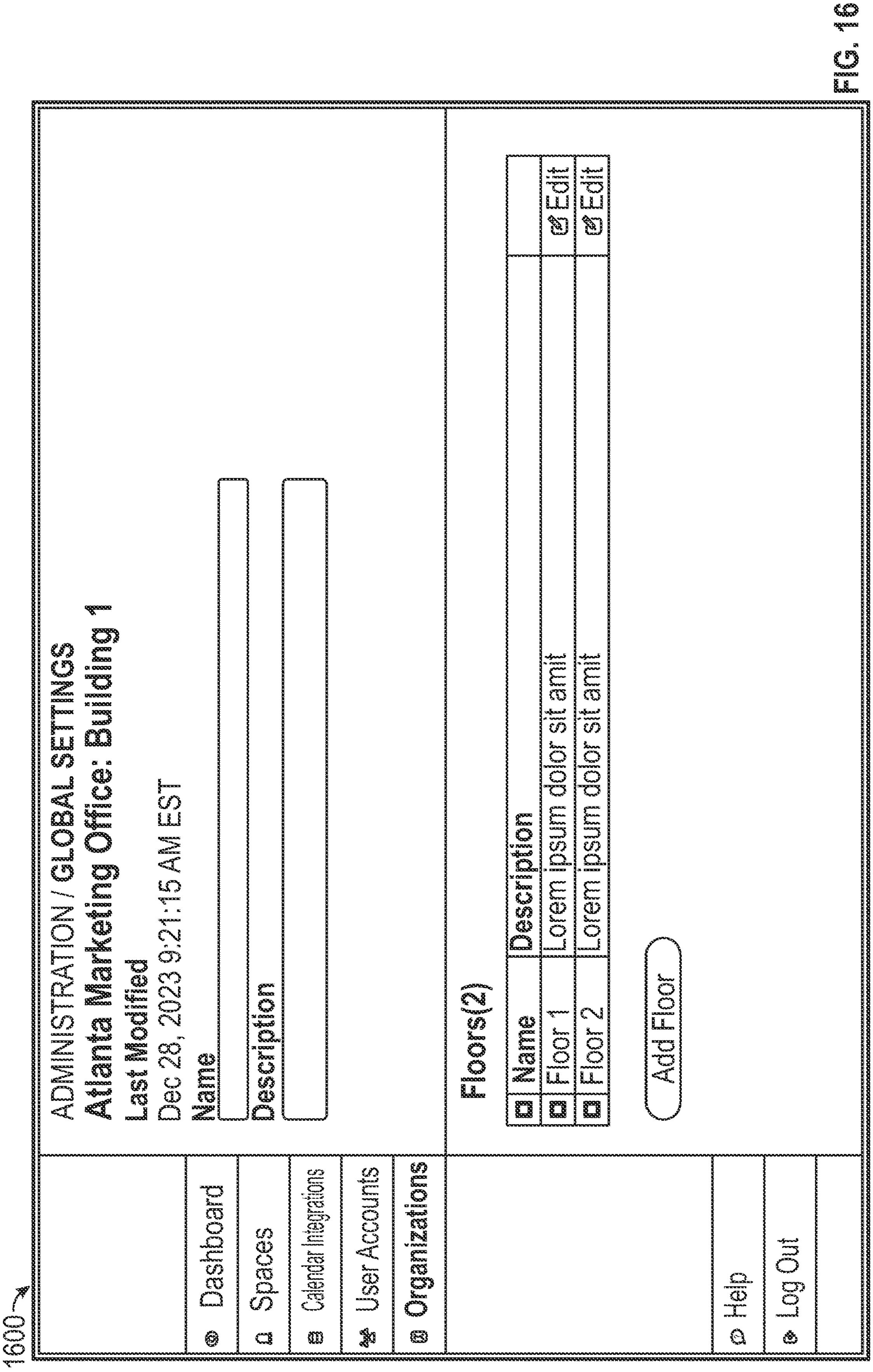
Figure 18:
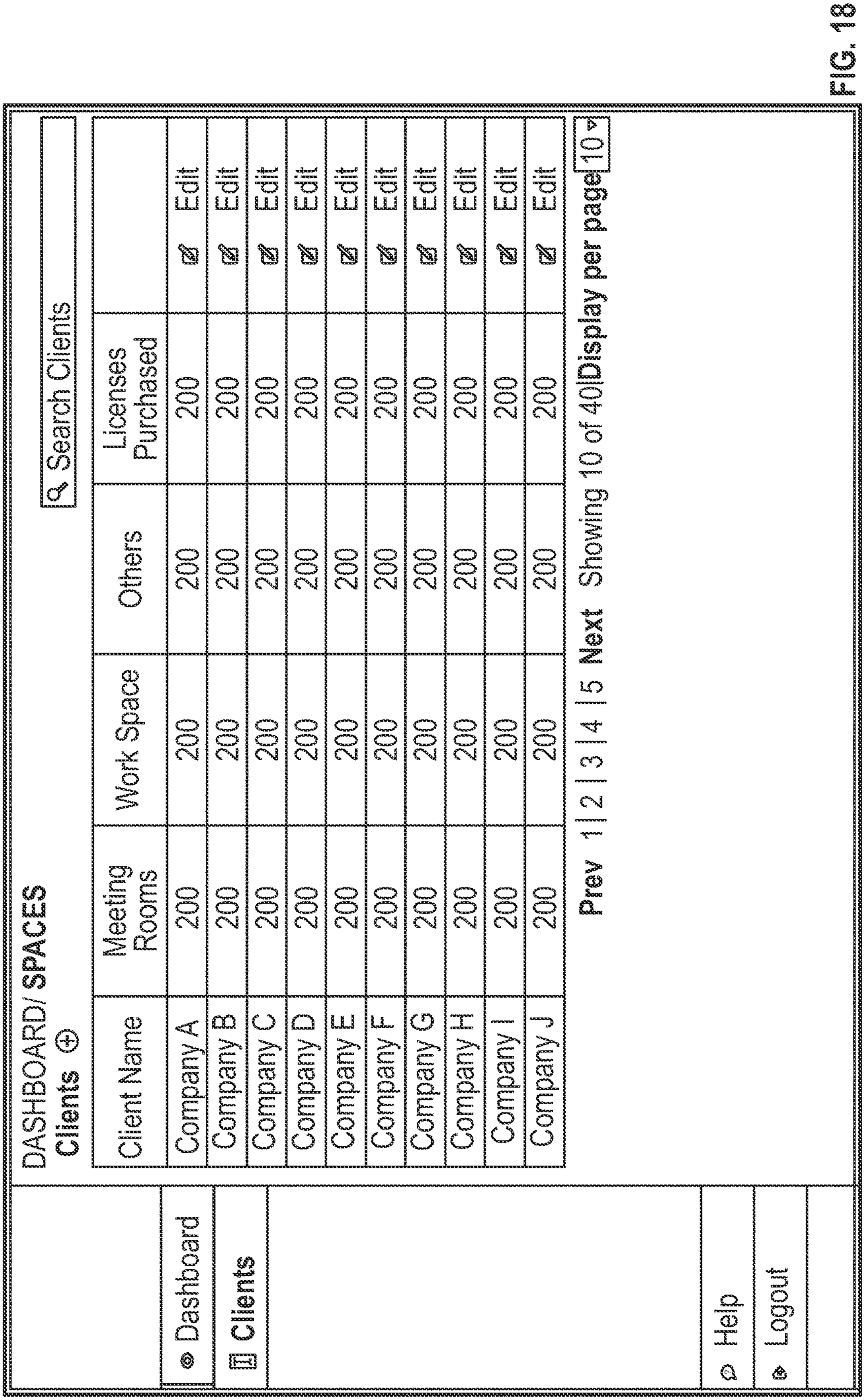
Figure 20:
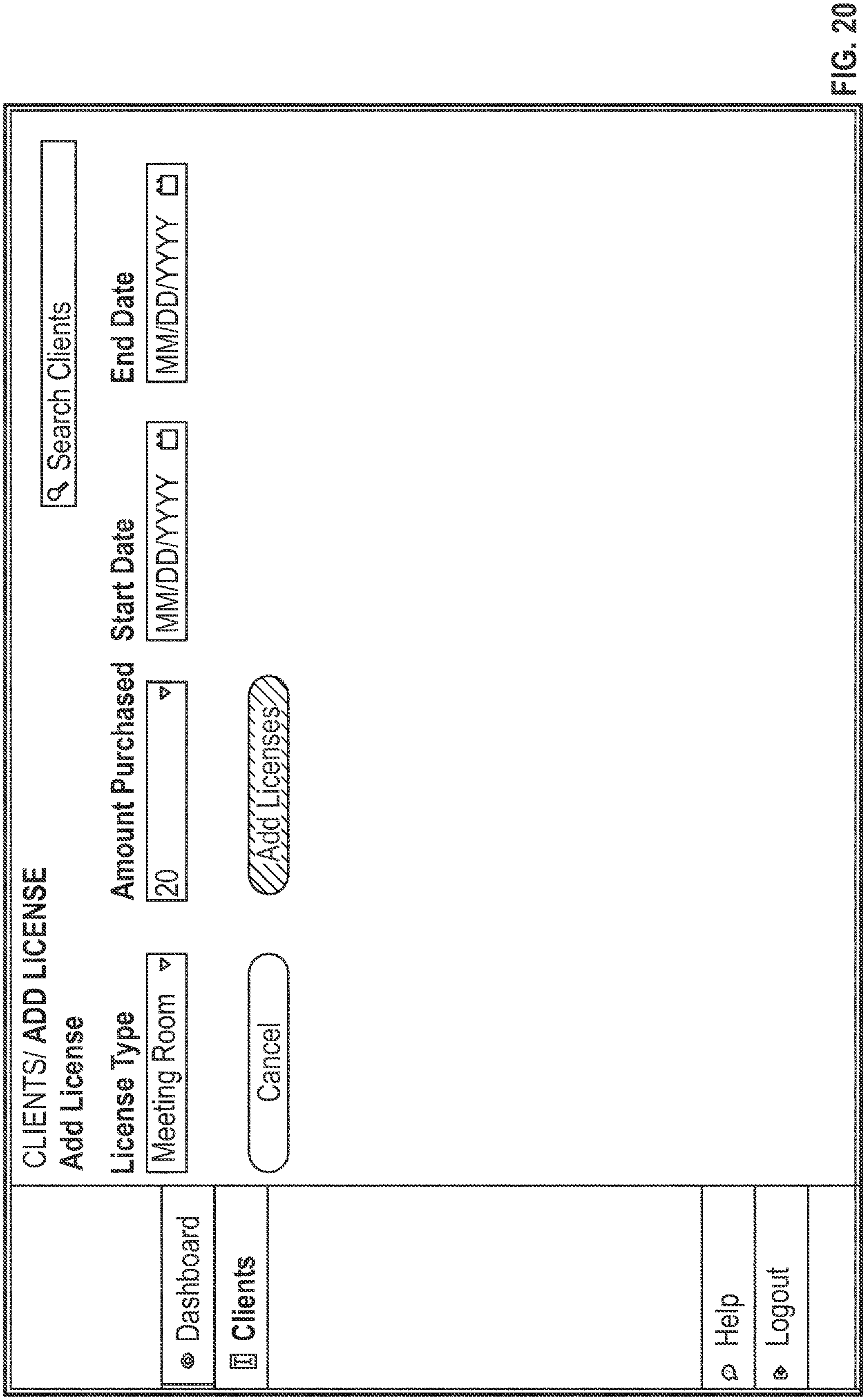

FIG. 11 displays user list 1100, which identifies user accounts and type, and provides options for adding, managing, copying, and deleting user accounts.

FIG. 12 displays multi-level configuration interface 1200. Multi-level configuration interface 1200 is operable to create and configure an organizational structure or hierarchy to better associate shared spaces with specific portions of an organization's business. Fields are provided to identify the name of the top-level organization and provide optional description. Multi-level configuration interface 1200 may be used to, e.g., manage global settings applicable to sub-organizations or buildings (e.g., limits on walk-up reservation hours, PIN protection for walk-up reservations, and assignment of a master unlock PIN usable to unlock all bookings). Multi-level configuration interface 1200 provides fields usable to identify and manage additional levels of an organization, such as subsidiaries or affiliates, in addition to buildings associated with each organizational level. FIGS. 13-16 illustrate sub-organization configuration interfaces 1300, 1400, and 1500, respectively, and building configuration interface 1600, where progressively lower or additional organizational tiers can be created and managed, or individual buildings can be identified and associated with appropriate organizational units.

FIG. 17 provides client dashboard 1700. Client dashboard 1700 identifies client business units by name and provides additional summaries of notable data such as the total number of spaces managed, similarly to dashboard 400. Client dashboard 1700 is intended for use by client administrators to operate as "super-users" with permission to add, edit, delete and manage clients and administer licenses similarly to administrators via client license management tools illustrated in FIGS. 18-20.

Turning now to FIGS. 21-32, a series of exemplary screens displayable on personal electronic devices 110 are shown. These exemplary screens are provided to illustrate how shared space information may be presented to user 111 via an interactive augmented reality user interface, or used to prompt a user 111 for input of booking parameters. The exemplary screens are not intended to limit the inventions described herein from alternative representations as may be known by one of skill in the art.

Figure 21:
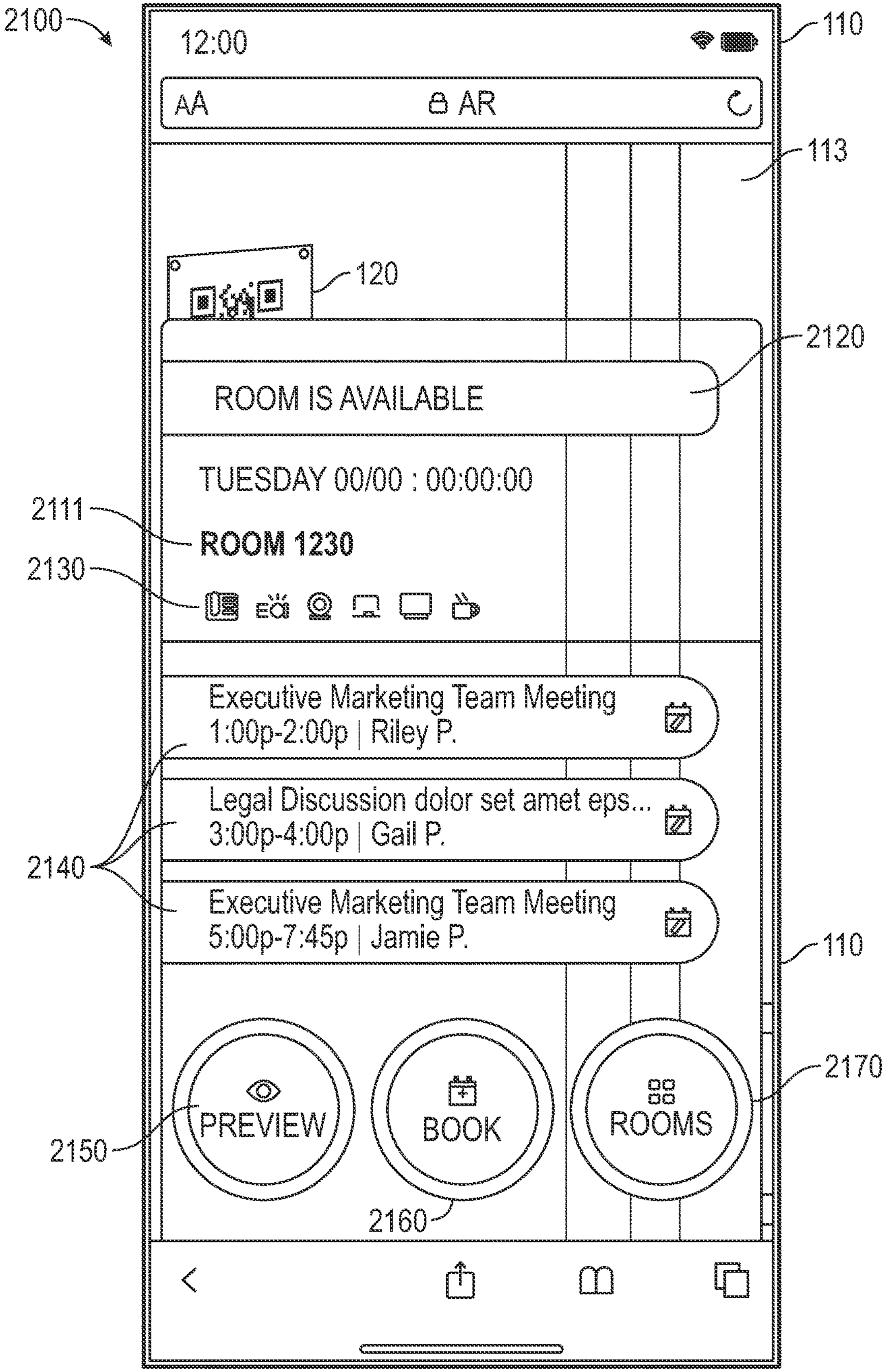
FIGS. 21-32 are exemplary screens of an interactive augmented reality user interface and augmented reality elements displayed on a personal electronic device display according to an embodiment of the inventions disclosed herein.
Figure 28:
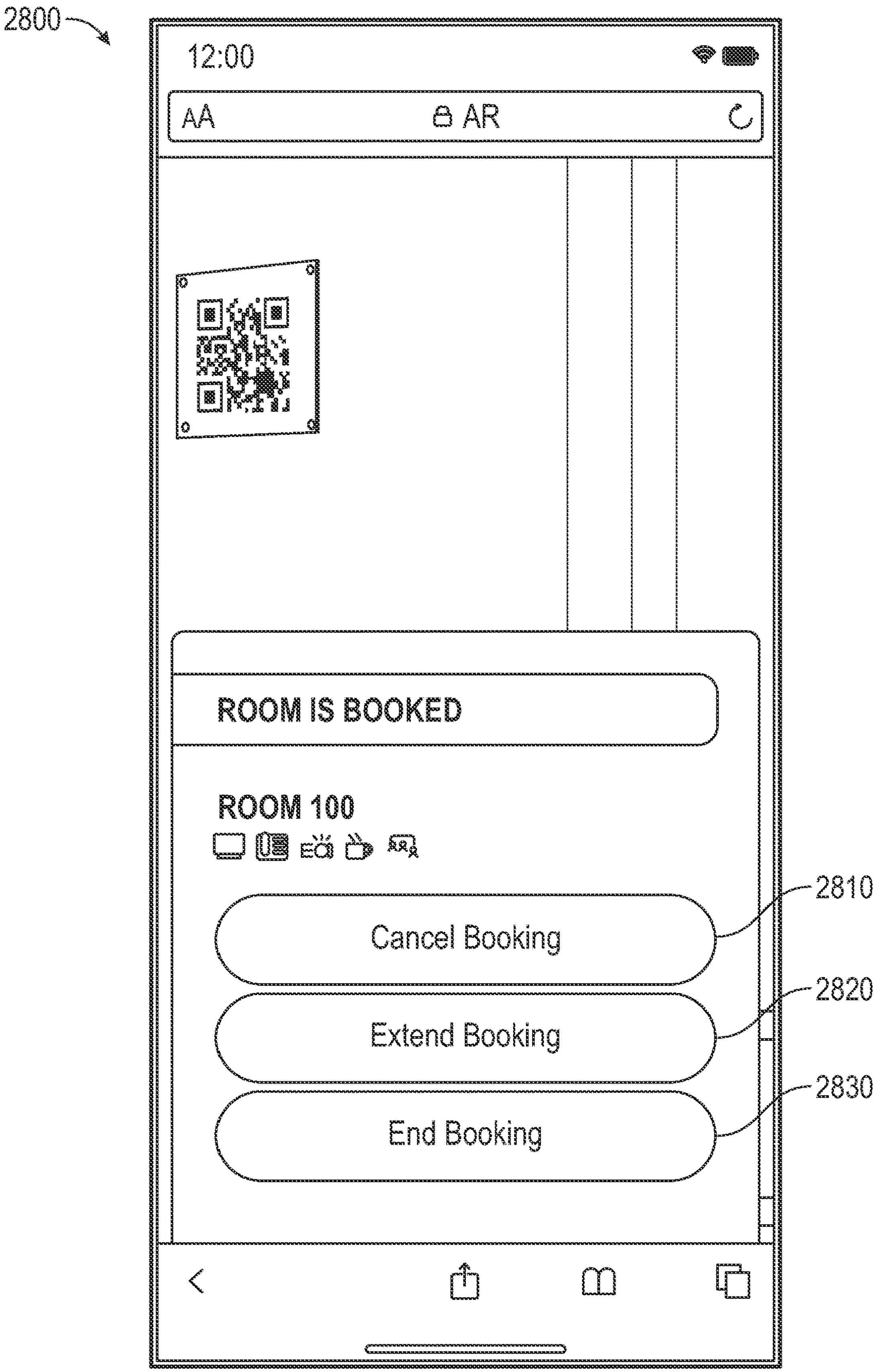
Figure 29:
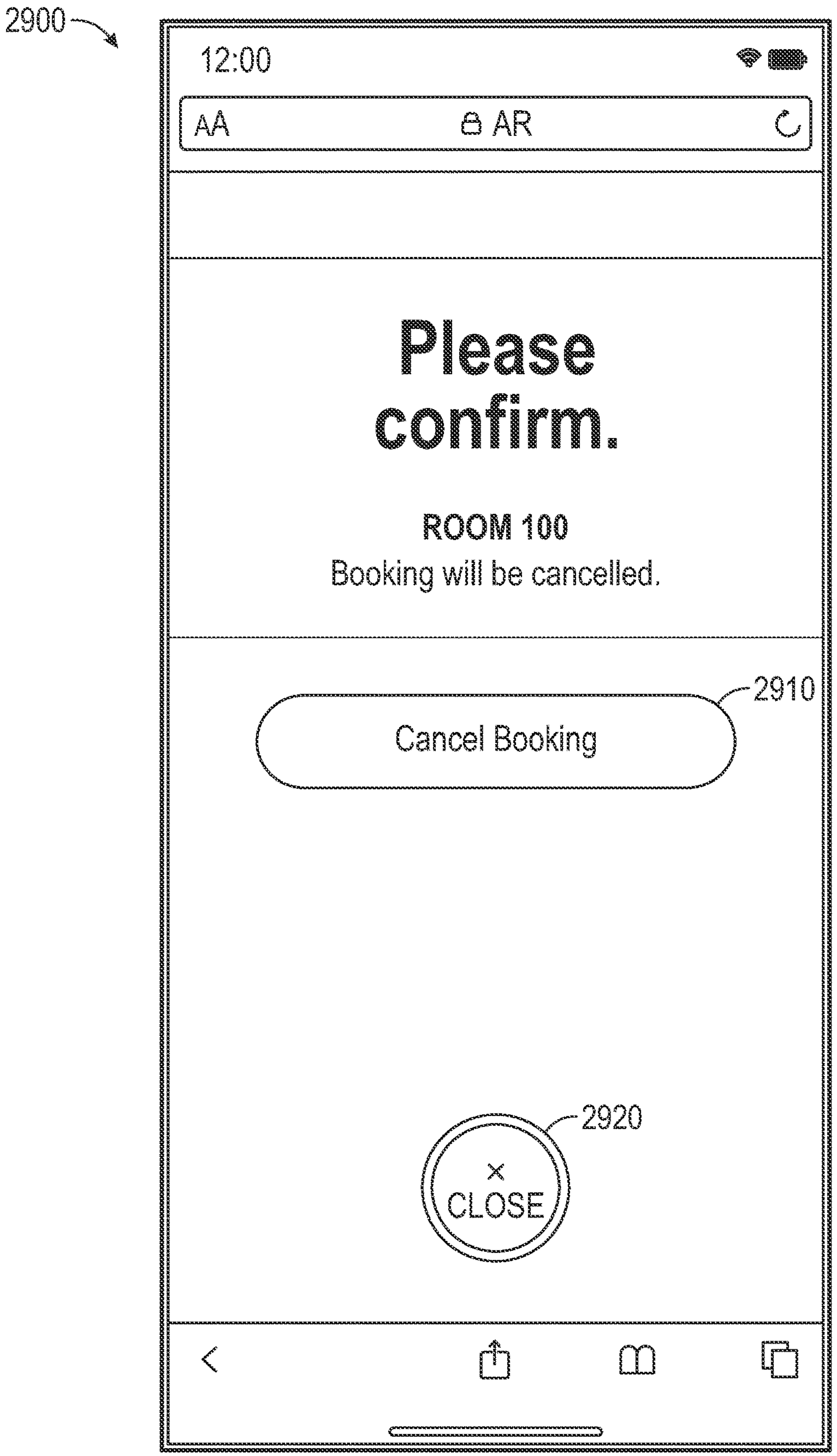

In FIG. 21, shared space summary 2100 is shown. In this example, personal electronic device 110 is used to scan shared space identifier 120, a QR code located outside the entrance of and associated with a shared space identified with shared space name 2111 as ROOM 1230. After shared space identifier 120 is scanned by camera 112 of personal electronic device 110, and permission is granted by user 111 to webAR application 140 to access camera 112, webAR application 140 is launched, and following the steps detailed above, generates virtual objects 160 to overlay camera feed 113. The shared space's availability for booking is queried by webAR application 140 to booking engine, and the result is rendered and displayed as "ROOM IS AVAILABLE," and a green-colored indicator bar 2120 is optionally displayed as a second indicator that the shared space is available. Alternatively, a red-colored indicator bar 2120 may be used to indicate the shared space is not available for booking. Alternate colors, graphics, or verbiage may be selected as secondary indicators of availability, or other status associated with the shared space. Shared space resources, in this case, AV equipment, are represented with icons 2130. Existing bookings 2140 may also be displayed and may further indicate information associated with each booking, e.g., a booking title or name, start time, end time, and the name of user 111. Other information associated with existing bookings 2140 may alternatively be displayed. In this example, user 111 can optionally interact with the list of existing bookings 2140, e.g., by touching display to select one of existing bookings 2140 and select from a menu of available actions to cancel or modify the booking as illustrated in FIG. 28.

Figure 22:
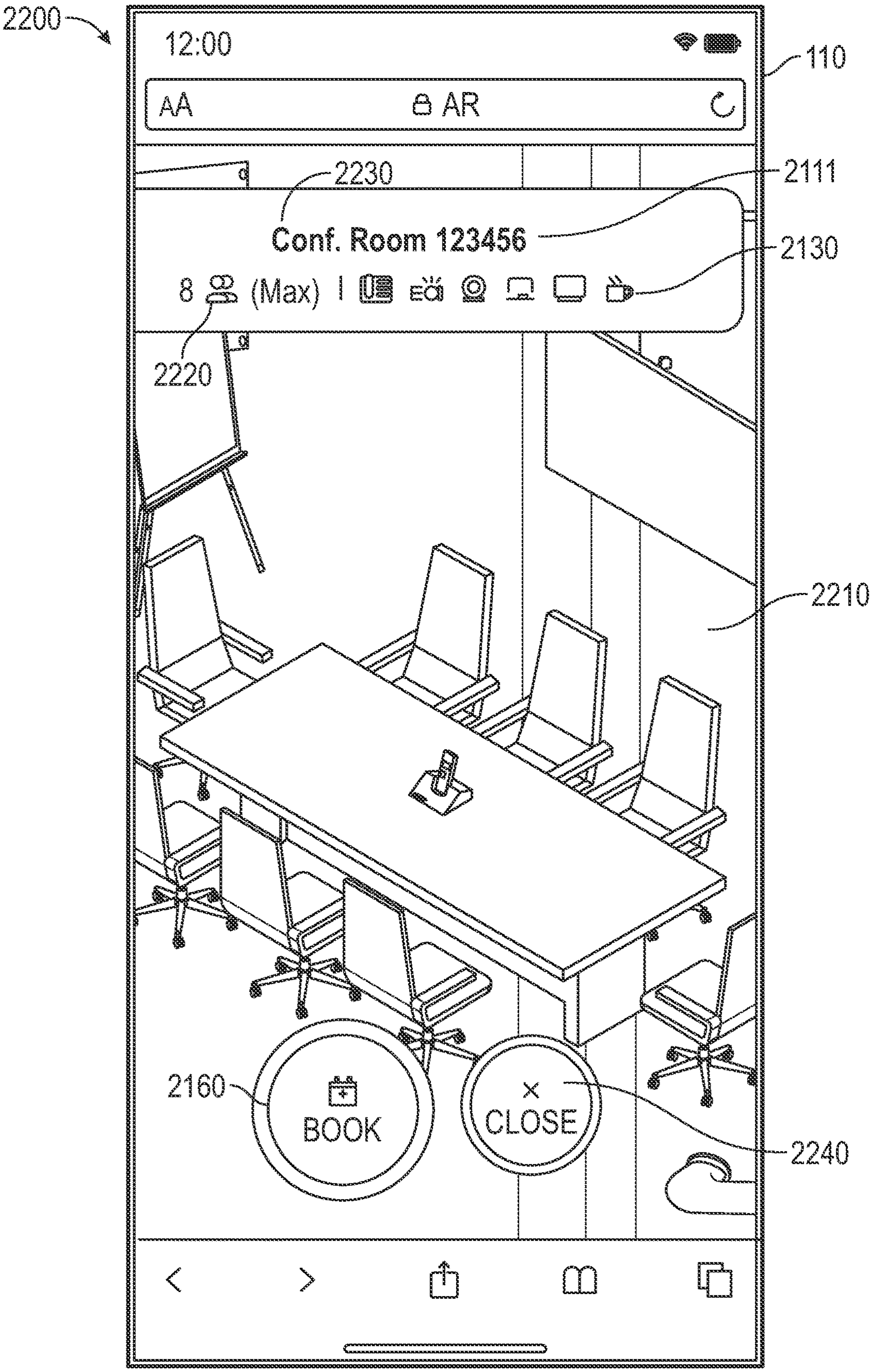

Also displayed on shared space summary 2100 are optional actions available to user 111. For example, preview button 2150, which when selected by user 111, prompts webAR application 140 to render and display preview 2200 comprising virtual objects 160 representing, e.g., a simulated 3D rendering 2210 of the shared space, as illustrated in FIG. 22. Preview 2200 may alternatively or additionally display representations of other information about the shared space, such as capacity 2220, available shared space resources represented by icons 2130, shared space type 2230, and other information about the shared space. Exit button 2240, when engaged, closes preview 2200 and returns user 111 to the prior screen display, in this example space summary 2100 as shown in FIG. 21.

Figure 23:
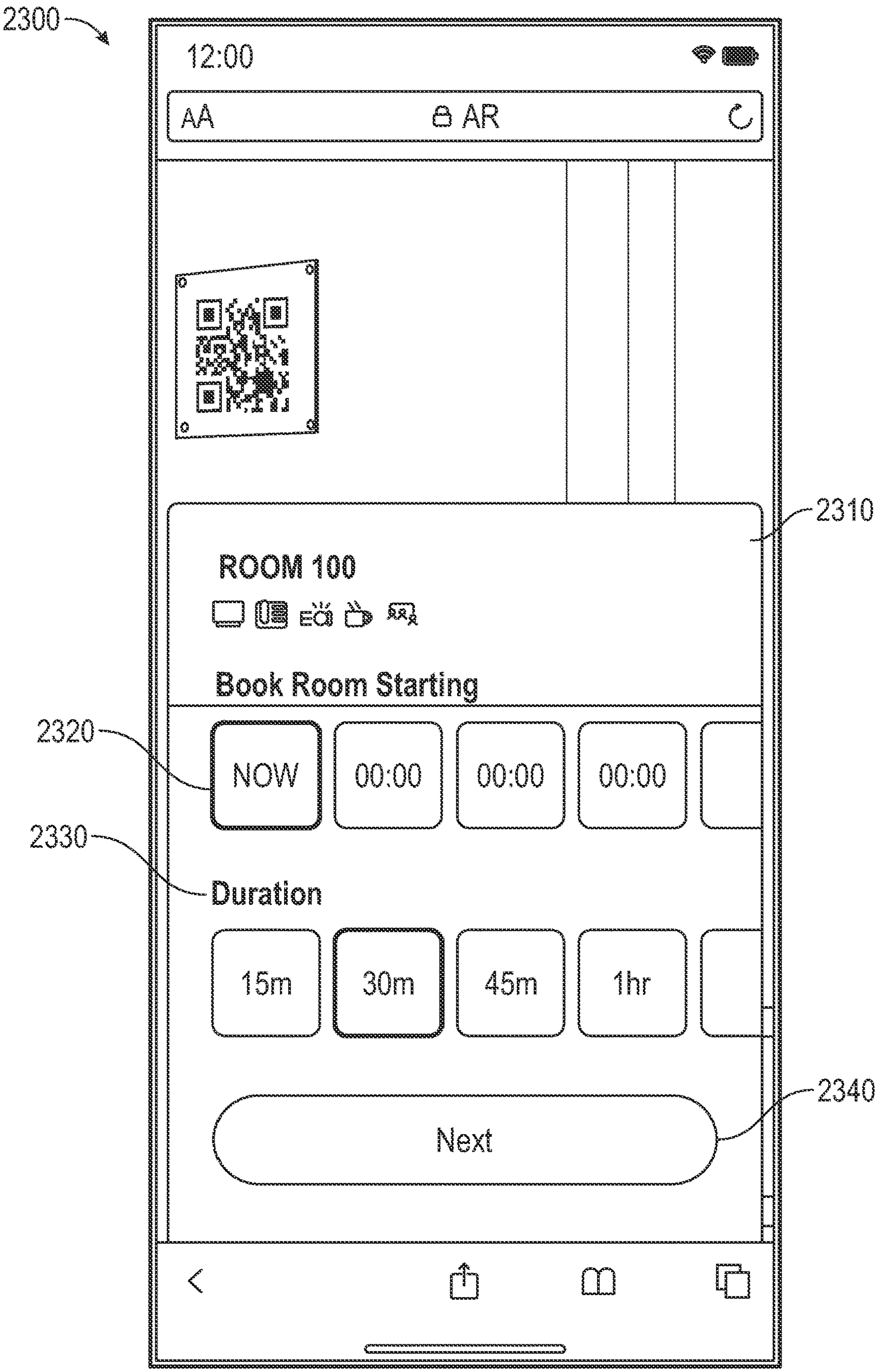
Figure 24:
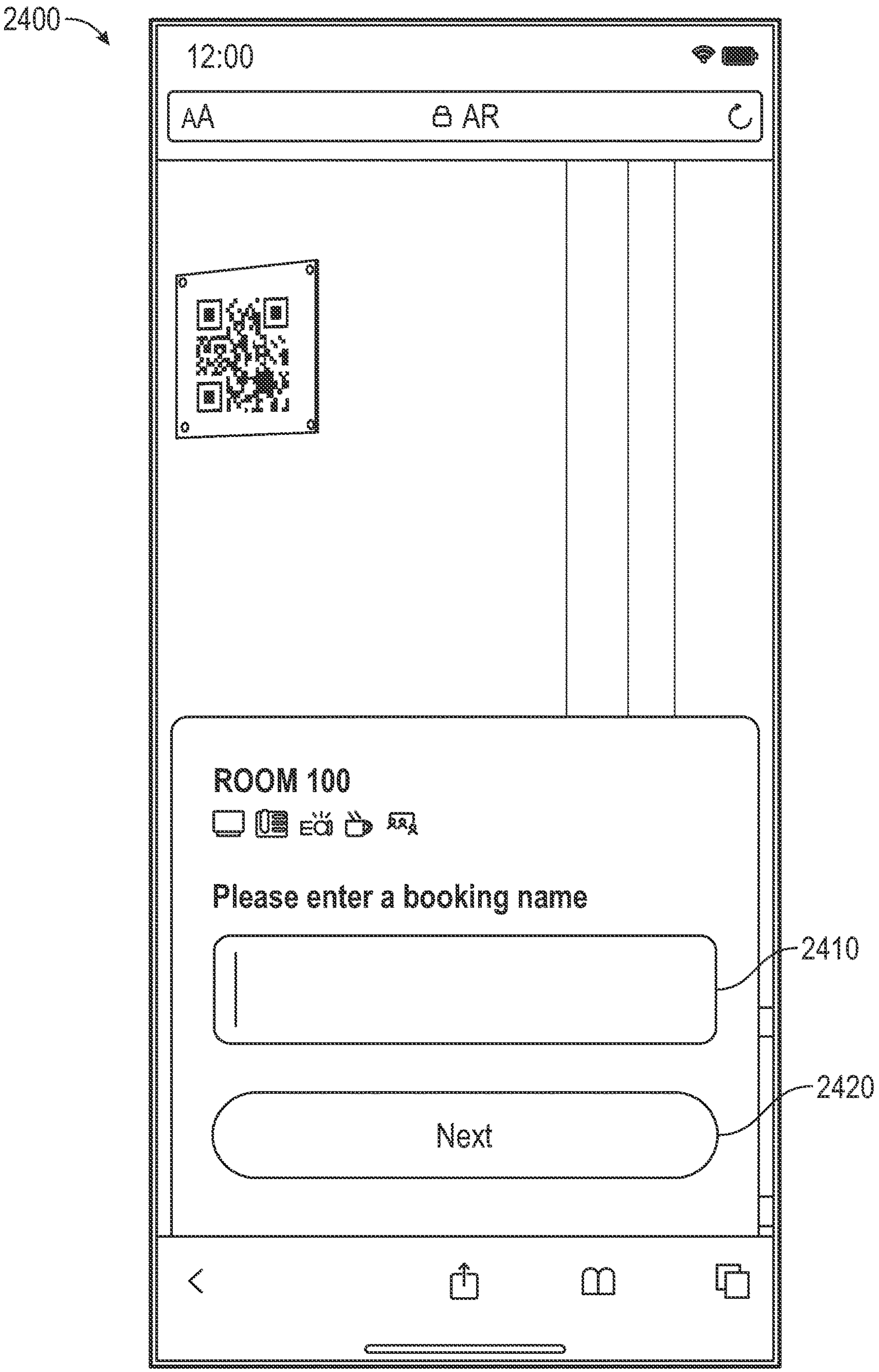
Figure 25:
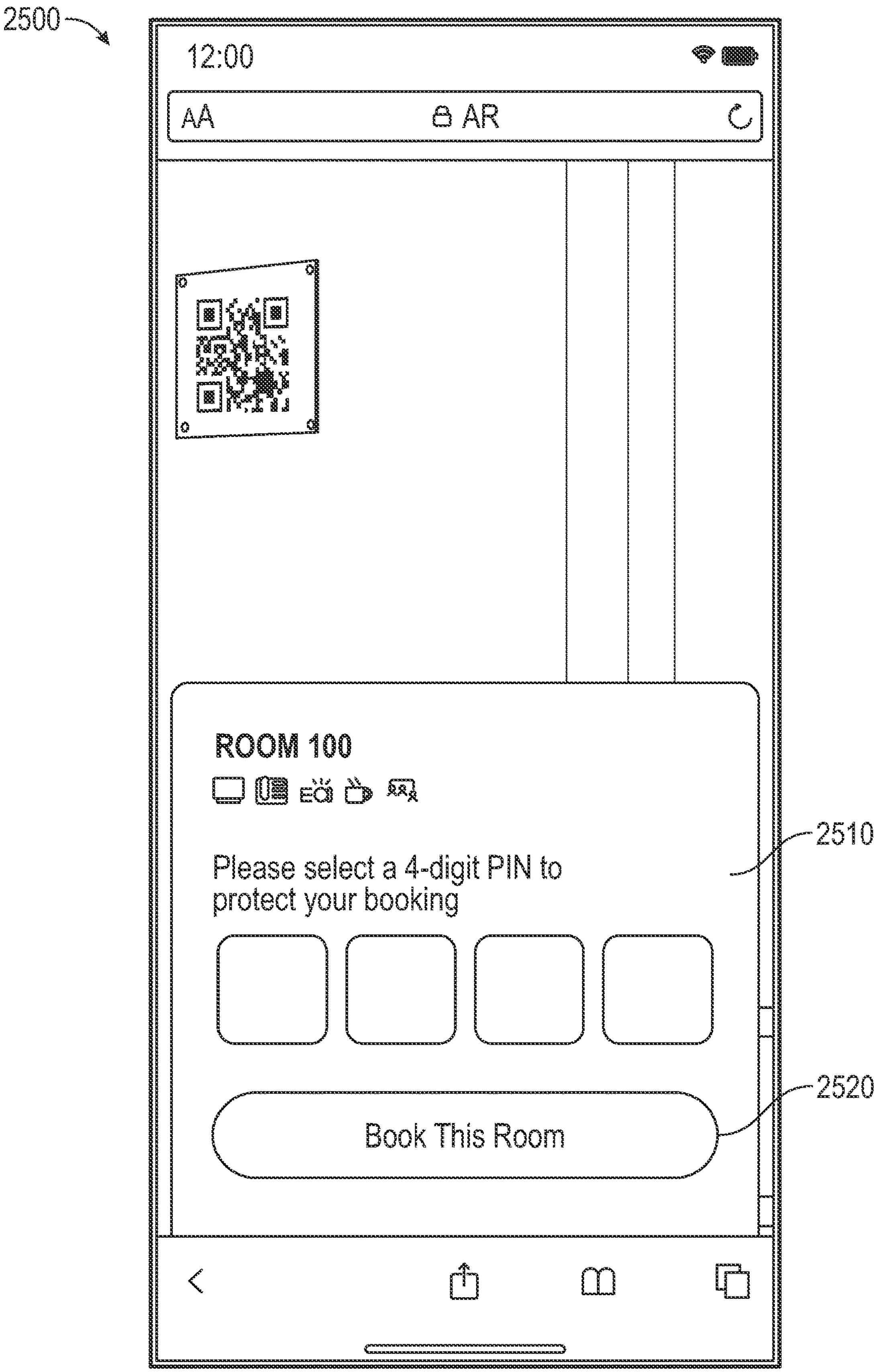

Book button 2160, when selected by user 111, prompts webAR application 140 to render and display virtual objects 160 or other representations of booking menu 2300, as illustrated in FIG. 23. Booking menu 2300 may provide selectable booking parameters 2310, which permit user 111 to view and select from available booking options. For example, users 111 can select a desired booking time represented by slot selector 2320 to book the shared space immediately or at an upcoming time (or day or date). Using duration selector 2330, users 111 can indicate the desired length of the booking in minutes or other time or scheduling increment. Selecting booking submission button 2340, represented by "Next," prompts webAR application 140 to render and display booking name menu 2400 as shown in FIG. 24. Booking name menu 2400 may include, for example, booking name field 2410, in which user 111 may indicate, e.g., by using a native keyboard of personal electronic device (not shown), a desired name or title to be associated with the booking. Alternatively, booking name menu 2400 may display alternate selectors, such as dropdown menus or pre-populated lists from which user 111 may select or indicate a desired booking name. Once a name or title is selected or input by user 111, user 111 may select booking name submission button 2420, represented by "Next," which submits user 111's desired booking name, and prompts webAR application 140 to render and display PIN selection menu 2500, as shown in FIG. 25. PIN selection menu 2500 may include PIN selection field 2510, in which user 111 may input, e.g., by using a native keyboard of personal electronic device, user interfaces, including workstations having keyboards, touch screens, pointing devices such as mice and trackballs, or other user input devices, connected via networked communications to webAR application 140, an optional personal identification number to be associated with the booking.

Figure 26:
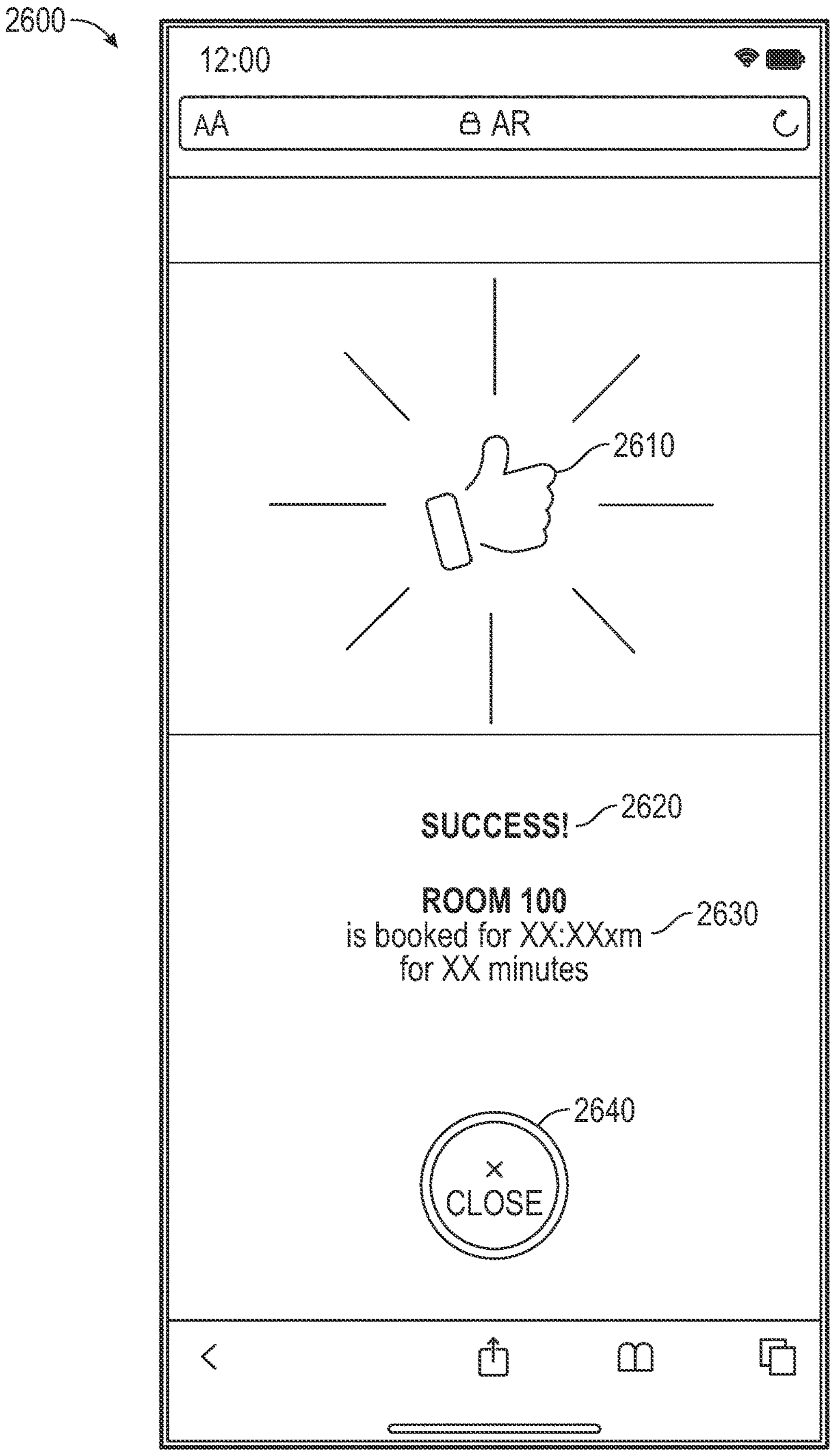

Alternatively, PIN selection menu 2500 may display other types of PIN selection field 2510 selection mechanisms, such as dropdown menus or pre-populated personal identification numbers from which user 111 may select a desired PIN. The PIN may be a 4-digit string, or other combination of letters, numbers, or other indicator such as graphics or icons. Associating a PIN with the booking may be used to protect the booking from modification or cancellation by others. In the future, when user 111 or others seek to modify or cancel the booking, webAR application 140 will prompt user 111 to enter the selected PIN before processing changes to the booking. The presentation of PIN selection menu 2500 may be optional, or the selection by user 111 of a desired PIN may be optional, depending on shared space booking system configuration or the policies of a user organization. Once a PIN is selected or input by user 111 (or, if available, optionally bypassed), user 111 may select booking confirmation button 2520, represented by "BOOK THIS ROOM." Selecting booking confirmation button 2520 prompts webAR application 140 to provide user 111's booking parameters and engage in a booking workflow whereby webAR application 140 engages booking engine to schedule user 111's booking. If the booking is successfully made, webAR application 140 may render and display booking confirmation screen 2600, as shown in FIG. 26.

Booking confirmation screen 2600 may be configured with optional confirmation graphics 2610, confirmation message 2620 (verbiage to indicate to user 111 that the booking has been successfully recorded), or confirmation details 2630, which may provide booking parameters such as the location, time, date, and duration of the booking. If the booking is unsuccessful, webAR application 140 may render and display alternative graphics, messages, or details (not shown) describing the failure of the booking to be confirmed, and provide other information or instructions for user 111 to, for example, re-submit booking parameters. Users 111 can select booking confirmation exit button 2640, here indicated by "CLOSE," which prompts webAR application 140 to exit booking confirmation screen 2600, and in this example, may return user 111 to shared space summary 2100, illustrated in FIG. 21.

Figure 27:
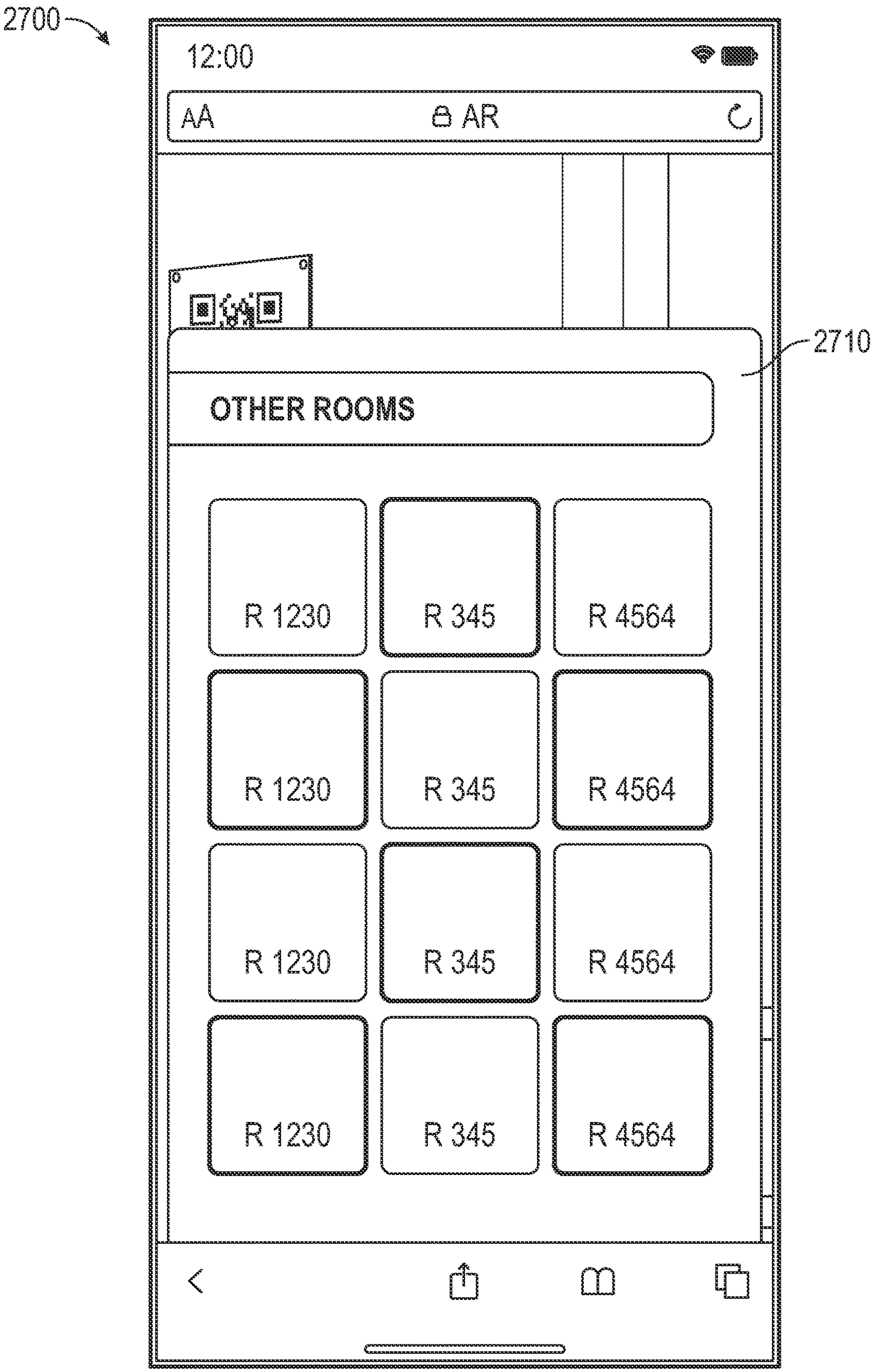

When user 111 selects alternate shared spaces button 2170 of shared space summary 2100, represented in the example shown in FIG. 21 as the "ROOMS" icon, webAR application 140 renders and displays virtual objects 160 or other representations of available shared spaces that can be viewed by user 111, as illustrated by shared spaces menu 2700, shown in in FIG. 27. In this example, shared spaces menu 2700 features shared spaces selector 2710 representing other shared spaces available for booking. Shared spaces menu 2700 may be optionally configured or filtered to display shared spaces that feature or comply with particular parameters, for example, features similar to a selected shared space (e.g., similar location, such as the same floor or building; similar space type, such as conference room or huddle space; similar capacity; or shared space resources, such as AV equipment). Shared spaces selector 2710 may represent shared spaces in a list, grid, graphically, or other way known to skilled artisans.

Real-time availability of shared spaces may further be represented by shared spaces selector 2710 by color-coding, graphics, verbiage or other indicators. For example, currently available shared spaces may be represented by shared spaces selector 2710 by outlining a shared space in green color, and unavailable spaces by outlining in red color. When user 111 selects a shared space from among shared spaces represented by shared spaces selector 2710, webAR application 140 is prompted to seek user 111's booking parameters and engage in the booking workflow described above, by, for example, presenting user 111 with booking menu 2300, booking name menu 2400, PIN selection menu 2500, etc.

When user 111 selects from among existing bookings 2140 displayed on shared space summary 2100, webAR application 140 renders and displays virtual objects 160 or other representations of booking modification menu 2800, as illustrated in FIG. 28. Booking modification menu 2800 displays representations associated with actions available for selection by user 111 to change parameters associated with an existing booking and create a booking modification request, which if accepted, results in a modified booking. In the example shown in FIG. 28, user 111 may cancel, extend, or end an existing booking by selecting from among cancel booking icon 2810, extend booking icon 2820, or end booking icon 2830. Other actions available to user 111 to modify an existing booking may alternatively be displayed with relevant icons. When user 111 selects cancel booking icon 2810, for example, webAR application 140 is prompted to seek user 111's confirmation that user 111 wishes to cancel the associated booking entirely, as illustrated by cancel confirmation menu 2900 shown in FIG. 29.

Cancel confirmation menu 2900 may display buttons or other selections to user 111 that must be engaged by user 111 before the existing booking is canceled, as shown by cancel booking confirmation icon 2910. If user 111 determines not to proceed with the cancellation, buttons or selections may be displayed on cancel confirmation menu 2900 to confirm user 111's intent not to cancel the booking, such as cancel confirmation exit button 2920. If user 111 selects cancel confirmation exit button 2920, for example, webAR application 140 is prompted to stop displaying cancel confirmation menu 2900 and not cancel the booking, and return user 111 to a prior screen, such as booking modification menu 2800 shown in FIG. 28.

If an existing booking is currently in progress, user 111 may be presented with selections on booking modification menu 2800 permitting user 111 to extend the length or total duration of time previously scheduled for an existing booking, or end the booking early, i.e., prior to the originally-scheduled end time of the existing booking.

Figure 30:
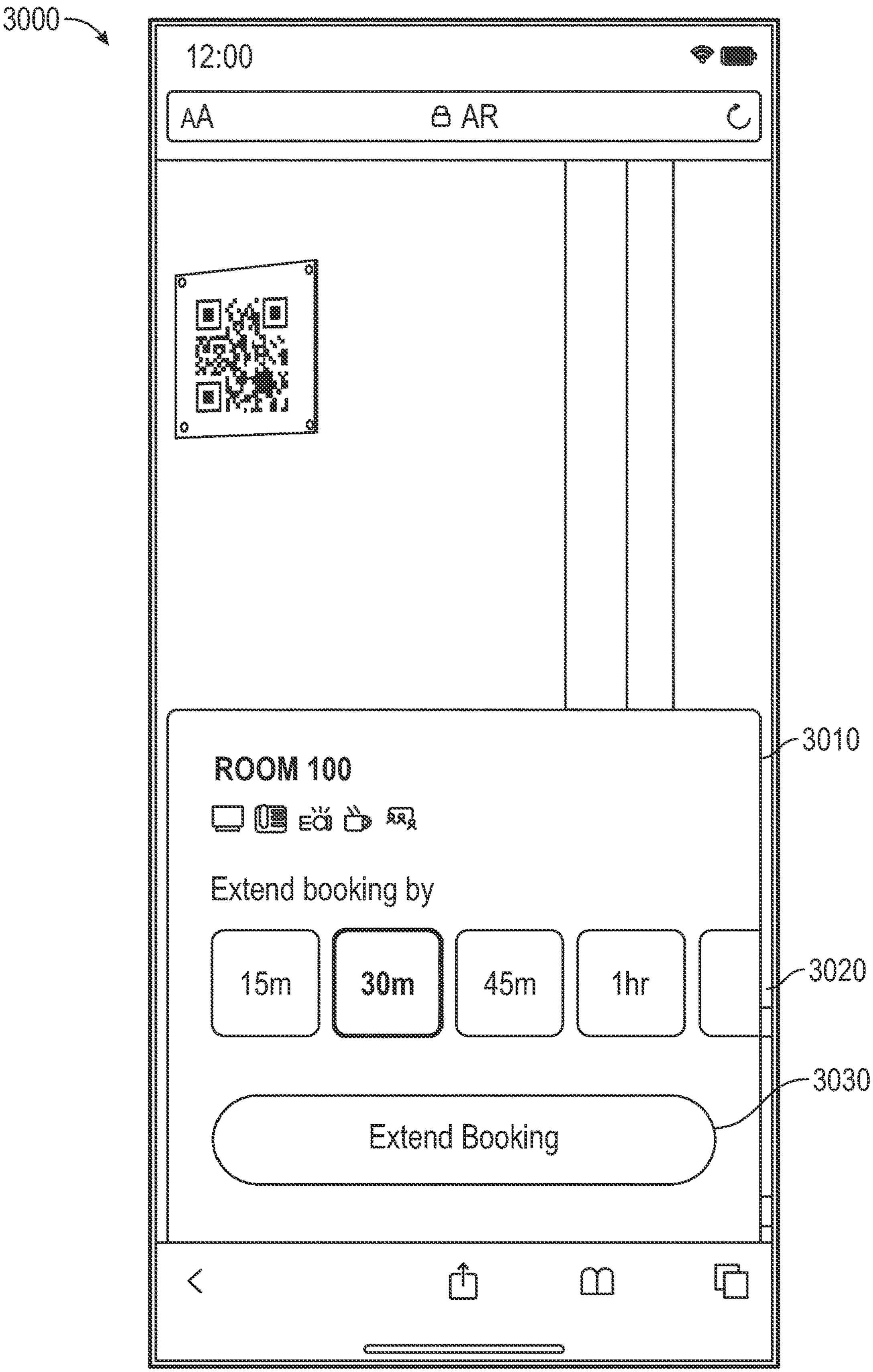
Figure 31:
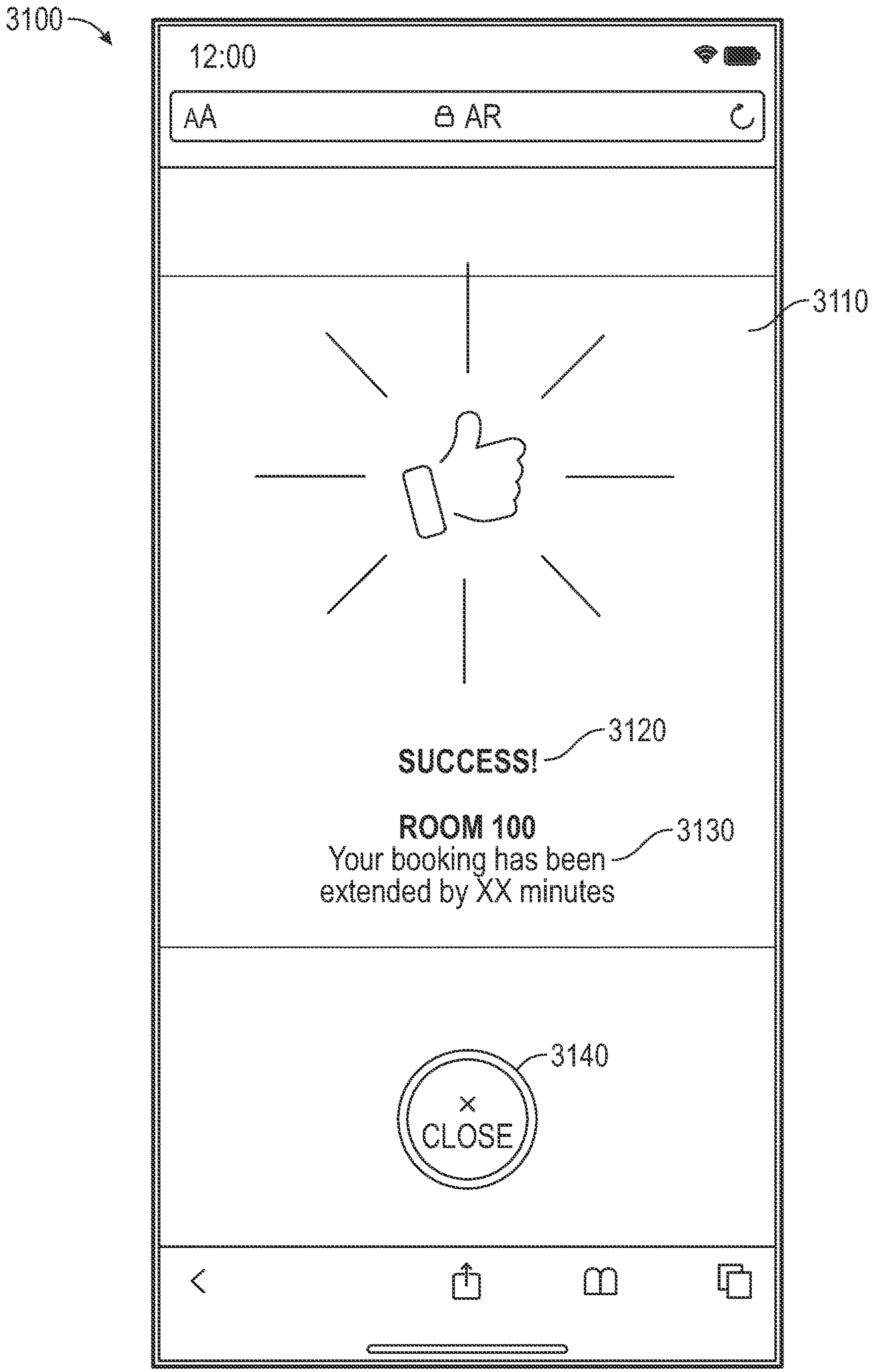

If user 111 selects extend booking icon 2820 on booking modification menu 2800, for example, webAR application 140 renders and displays extend booking menu 3000, illustrated in FIG. 30. User 111 may increase the duration of an existing booking by selecting from options presented by extend options selector 3010, which may include representations of, for example, additional time to be added to the total duration of a booking. For example, additional time may be represented by extend duration icons 3020, correlating to additional increments of time in minutes that may be added to the total duration of the existing booking. Other representations correlating to additional time may be presented on extend options selector 3010, by graphics or verbiage. Alternatively, extend options selector 3010 may display a field in which user 111 may input digits representing an amount of time (e.g., in minutes, hours, or days) using the native keyboard of personal electronic device 110 (not shown) to indicate a specific amount of time user 111 wishes to extend the scheduled duration of the existing booking. User 111 submits the request to extend the booking by selecting extend booking submission icon 3030, which prompts webAR application 140 to engage booking engine to process a modification of the existing booking in accordance with user 111's chosen parameters. If the modification is successful, webAR application 140 may render and display extend booking confirmation screen 3100, as shown in FIG. 31.

Extend booking confirmation screen 3100 may be configured with optional extend booking confirmation graphics 3110, extend booking confirmation message 3120 (verbiage to indicate to user 111 that the duration of the existing booking has been successfully extended and scheduled), or extension confirmation details 3130, which may provide the new duration of the booking or scheduled times. If the extend booking process is unsuccessful, webAR application 140 may render and display alternative graphics, messages, or details (not shown) describing the failure of the extension to be confirmed, and provide other information or instructions for user 111 to, for example, re-submit extension parameters. Users 111 can select extend booking confirmation exit button 3140, here indicated by "CLOSE," which prompts webAR application 140 to exit extend booking confirmation screen 3100, and may return user 111 to booking modification menu 2800, illustrated in FIG. 28.

Figure 32:
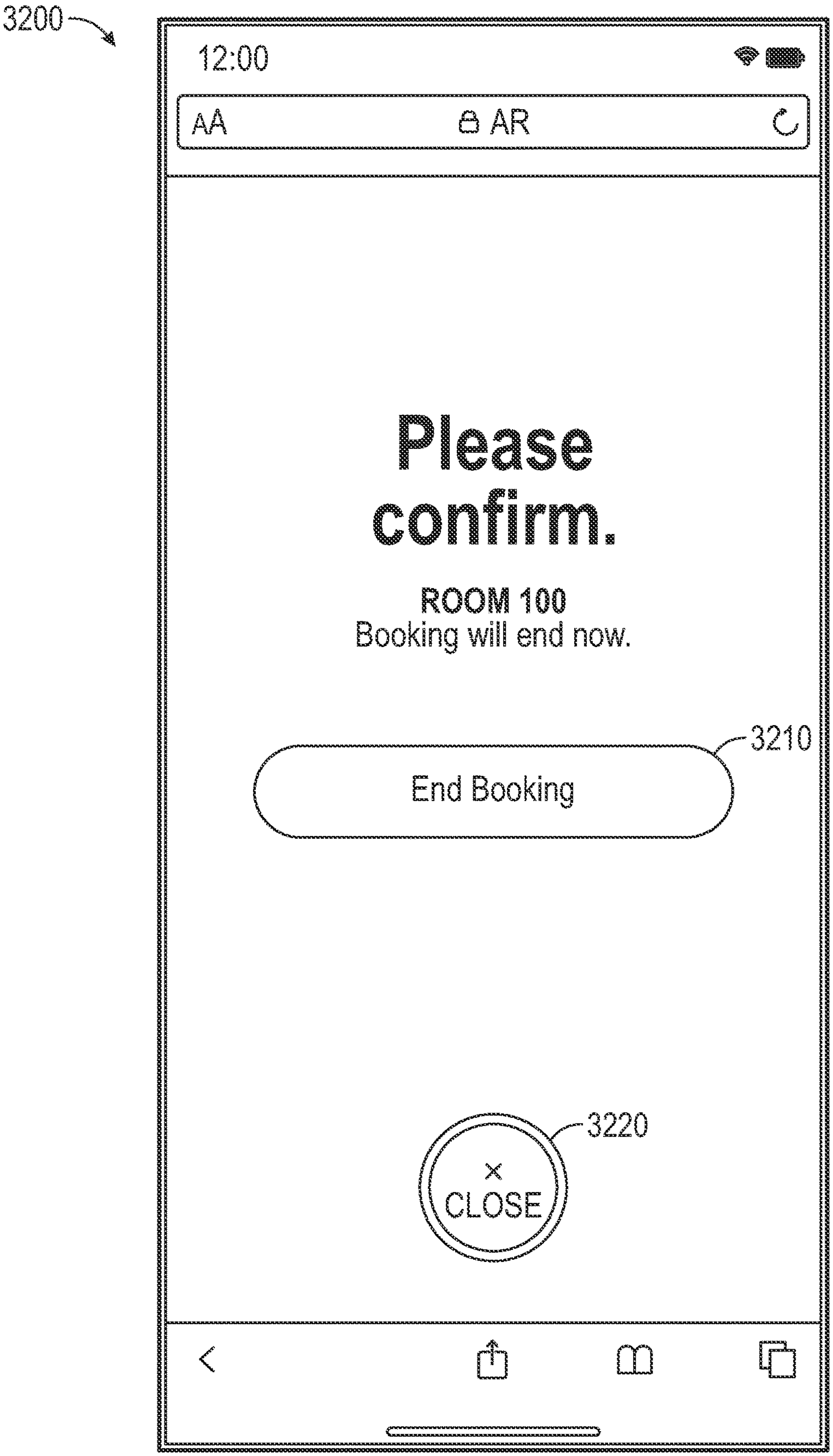

If, alternatively, user 111 selects end booking icon 2830 on booking modification menu 2800, webAR application 140 is prompted to seek user 111's confirmation that user 111 wishes to terminate the existing booking, as illustrated by end booking confirmation icon 3210 shown in FIG. 32. End booking confirmation menu 3200 may display buttons or other selections to user 111 that must be engaged by user 111 before the existing booking is terminated, as shown by end booking confirmation icon 3210. If user 111 determines not to proceed with ending the booking, buttons or selections may be displayed on end booking confirmation menu 3200 to confirm user 111's intent not to end the remaining duration of the booking, such as end booking confirmation exit button 3220. If user 111 selects end booking confirmation exit button 3220, for example, webAR application 140 is prompted to stop displaying end booking confirmation menu 3200 and not modify the duration of the existing booking, and return user 111 to a prior screen, such as booking modification menu 2800.

The programs and applications described herein may be used in an Internet environment, where the server is a web server and the request is formatted using HTTP (or HTTPS). Alternatively, the server may be in a corporate intranet, extranet, or any other type of network. Use of the term "Internet" herein, when discussing processing associated with user 111 requests, includes these other network environments, unless otherwise stated. Additionally, an interactive graphical user interface or other module may be implemented as an intelligent hardware component incorporating circuitry including custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

One or more functions of a web client or other module may be implemented as application software in the form of a set of processor-executable instructions stored in a memory of a personal electronic device 110, and capable of being accessed and executed by a processor of the user device.

In embodiments of the present invention, one or more of the above modules, may also be implemented in combinations of software and hardware for execution by various types of computer processors coupled to such hardware.

As used herein, a module of executable code may, for instance, comprise one or more physical or logical blocks of computer instructions which may, for instance, be organized as an object, procedure, process or function. Nevertheless, the executables of an identified module need not be physically located together, but may comprise separate instructions stored in different locations which, when joined logically together, define the module and achieve the stated purpose for the module.

In embodiments of the present invention, a module of executable code may be a compilation of many instructions, and may be distributed over two or more different code partitions or segments, among different programs, and across two or more devices. Similarly, data, including by way of example shared space information, may be identified and illustrated herein within modules, and may be embodied in any suitable form and organized within any suitable type of data structure. Such data may be collected as a single data set, or may be distributed over different locations including over different storage devices, and may exist, at least partially, merely as electronic signals on a system and/or network as shown and described herein.

A processor may provide an output signal having data indicative of one or more data items. An output signal may be carried either over a suitable medium, such as wire or fiber, or wirelessly. An output signal may transmit data from one device to another directly, such as over a bus of a computer system from a processor to a memory device, or indirectly, such as over multiple networks, and with intermediate steps of storage in a buffer or memory device and retransmission. Such an output signal may be provided by the processor to a bus of a computer system together with address data at a series of clock intervals. The address data may designate a destination device on a bus, by way of example. In embodiments, an output signal may be a signal output from a hardware communications device of a computer system to a network, such as a local area network, a wide area network, or a network of interconnected networks, such as the Internet.

Output signals may include, by way of example, data identifying formats, fields, and content of fields. Signals may be compatible with any appropriate format. Reference to an output signal having particular data may include one or more signals bearing the information. Multiple signals bearing the information may include sequences of digital data bearing the information interleaved with sequences of digital data relating to other information. By way of example, a signal may be packetized for transmission. By way of further example, an output signal may take the form of an uncompressed digital signal or a compressed digital signal.

A system on which the methods of embodiments of the present invention may be implemented includes at least one central processing computer or computer network server. A network server includes at least one controller or central processing unit (CPU or processor), at least one communication port or hub, at least one random access memory (RAM), at least one read-only memory (ROM) and one or more databases or data storage devices. All of these later elements are in communication with the CPU to facilitate the operation of the network server. The network server may be configured in many different ways. For example, a network server may be a standalone server computer or alternatively, the functions of a network server may be distributed across multiple computing systems and architectures.

A network server may also be configured in a distributed architecture, wherein databases and processors are housed in separate units or locations. Some such servers perform primary processing functions and contain at a minimum, a RAM, a ROM, and a general controller or processor. In such an embodiment, each of these servers is attached to a communications hub or port that serves as a primary communication link with other servers, client or user computers and other related devices. The communications hub or port may have minimal processing capability itself, serving primarily as a communications router. A variety of communications protocols may be part of the system, including but not limited to: Ethernet, SAP, SAS™, ATP, Bluetooth, GSM and TCP/IP.

Data storage device may include hard magnetic disk drives, optical storage units, CD-ROM drives, or flash memory, by way of example. Data storage devices contain databases used in processing calculations embodied in algorithms, including data for display on client devices. In one embodiment, database software creates and manages these databases. Shared space information and/or algorithms in accordance with an embodiment of the present invention may be stored in storage devices and accessed and executed by a processor.

The computer program code required to implement the above functions (and the other functions described herein) can be developed by a person of ordinary skill in the art, and is not described in detail herein.

While particular embodiments of the invention have been illustrated and described, various modifications and combinations can be made without departing from the spirit and scope of the invention, and all such modifications, combinations, and equivalents are intended to be covered and claimed.

The foregoing is intended to provide a brief, general description of an illustrative and/or suitable exemplary environment in which embodiments of the described present invention may be implemented. This is exemplary of a suitable environment and not intended to suggest any limitation as to the structure, scope of use, or functionality of an embodiment of the present invention. A particular environment should not be interpreted as having any dependency or requirement relating to any one or combination of components illustrated in an exemplary operating environment. For example, in certain instances, one or more elements of an environment may be deemed not necessary and omitted. In other instances, one or more other elements may be deemed necessary and added.

The embodiments described below are merely exemplary, which can be embodied in various forms, as appreciated by one skilled in the art. Therefore, it is to be understood that any structural and functional details disclosed herein are not to be interpreted as limiting, but merely as a basis for the claims and as a representation for teaching one skilled in the art to variously employ the discussed embodiments. Furthermore, the terms and phrases used herein are not intended to be limiting but rather to provide an understandable description of the illustrated embodiments.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the illustrated embodiments, exemplary methods and materials are now described.

It must be noted that as used herein and in the appended claims, the singular forms “a”, “an,” and “the” include plural referents unless the context clearly dictates otherwise. It is to be appreciated that the embodiments discussed below are preferably a software algorithm, program or code residing on computer useable medium having control logic for enabling execution on a machine having a computer processor. The machine typically includes memory storage configured to provide output from execution of the computer algorithm or program.

As used herein, the term “software” is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described above. One skilled in the art will appreciate further features and advantages of the illustrated embodiments based on the above-described embodiments. Accordingly, the illustrated embodiments are not to be limited by what has been particularly shown and described, except as indicated by the appended claims.

We claim:

1. A shared space booking system, comprising:

a web-based augmented-reality (webAR) application executed within a browser runtime of a personal electronic device and delivered as web content without installation of a native application on the personal electronic device, that, upon recognizing and decoding a shared-space identifier comprising a machine-readable visual code or image detected in a camera feed using image analysis of pixel data in the camera feed, renders, over a live camera feed, a virtual object representing booking availability returned from a booking engine in real time;

the booking engine comprising a central processing unit and a communication transceiver that aggregates, via the web-based augmented reality (webAR) application, over a network, a plurality of shared space booking parameters from a personal electronic device, and shared space availability from a calendar system, wherein the booking engine stores shared space bookings in a non-transitory storage medium comprising a booking database, and maintains consistency between the booking database and the calendar system using transactional updates and generates availability in real time by reconciling the shared space availability and the shared space bookings; and an interactive augmented reality user interface distributed to the personal electronic device, by the webAR application, and displayed on the personal electronic device, based on the detection and decoding of the shared space identifier including extracting an identifier value from image data in the camera feed, wherein the webAR application displays, via the interactive augmented reality user interface, the plurality of shared space booking parameters, the webAR application receives a selection of a shared space booking parameter from the displayed plurality of shared space booking parameters, and the webAR application, upon receiving the selected shared space booking parameter, generates a query prompting the booking engine to compare the selected shared space booking parameter to the shared space availability in the booking database and provide a query response, the webAR application, upon receiving the query response, updates the interactive augmented reality user interface with the query response; and the webAR application recognizes and tracks the shared-space identifier across successive frames of the camera feed, performs pose estimation to determine a spatial relationship between the personal electronic device and the shared space, and virtually anchors the virtual object to a real-world surface represented in the camera feed, and updating the virtual anchoring of the virtual object in response to changes in the pose estimation to maintain spatial consistency as the camera feed changes.

2. A computer-implemented method for booking a shared space via a personal electronic device comprising a camera in communication with a web-based augmented reality (webAR) application and a booking engine, comprising the steps of:

accessing, by the webAR application, the camera of the personal electronic device;

generating a camera feed and displaying the camera feed on a display of the personal electronic device;

recognizing and decoding, by the webAR application, a shared space identifier imaged in the camera feed wherein the shared-space identifier comprises a machine-readable visual code or image that is detected in the camera feed by the webAR application using image analysis of pixel data in the camera feed;

rendering, by the webAR application, over the camera feed, a virtual object representing booking availability returned from a booking engine in real time, the webAR application requiring no native installation and wherein a first virtual object is associated with a plurality of shared space booking parameters and a shared space;

displaying the first virtual object in combination with the camera feed on the display;

receiving, by the webAR application, a selection of a shared space booking parameter from the plurality of shared space booking parameters associated with the displayed virtual object;

generating a query comprising the selected shared space booking parameter, and communicating the query to the booking engine;

comparing, by the booking engine, the selected shared space booking parameter to shared space information stored in a booking database, and generating a query response;

receiving, by the webAR application, the query response;

delivering, by the webAR application, a second virtual object to the personal electronic device based upon the query response;

displaying the second virtual object in combination with the camera feed on the display;

recognizing and tracking the shared-space identifier across successive frames of the camera feed;

performing pose estimation to determine a spatial relationship between the personal electronic device and the shared space; and virtually anchoring the virtual object to a real-world surface represented in the camera feed.

3. The computer-implemented method of claim 2, wherein the second virtual object represents a booking availability for the shared space.

4. The computer-implemented method of claim 2, comprising the step of receiving, by the webAR application, a booking request for the shared space.

5. The computer-implemented method of claim 4, comprising the step of recording a booking in the booking database.

6. The computer-implemented method of claim 5, comprising the step of receiving, by the webAR application, a booking modification request.

7. The computer-implemented method of claim 6, comprising the step of communicating the booking modification request to the booking engine.

8. The computer-implemented method of claim 6, comprising the step of modifying the booking stored in the booking database.

9. The computer-implemented method of claim 4, comprising the step of delivering instructions to a calendar application to update a calendar with the booking.

10. The computer-implemented method of claim 2, comprising the step of delivering, by the webAR application, a third virtual object representing a modified booking.

11. The computer-implemented method of claim 2, wherein the first virtual object comprises one or more of a booking availability, a scheduled booking in the shared space; a 3D rendering of the shared space; a 2D rendering of the shared space; a floor plan; a capacity of the shared space; a shared space name; a shared space type; and a shared space location.

12. The computer-implemented method of claim 2, wherein the selecting of the shared space booking parameter comprises selection of one or more of a date; a time; a duration; a shared space location; a shared space resource; a capacity of the shared space; a booking name; a shared space name; a shared space type; and a personal identification number.

13. The computer-implemented method of claim 2, comprising the step of receiving a payment associated with the booking.

14. The computer-implemented method of claim 2, comprising the step of displaying gyroscope and accelerometer data synchronized with pose estimation of the virtual object with the camera feed on the display.

15. The computer-implemented method of claim 2, comprising the step of recognizing and tracking, by the webAR application, a visual marker in the camera feed.

16. The computer-implemented method of claim 2, wherein the first virtual object comprises one or more of a 3D graphic, a texture, and a lighting effect.

17. The computer-implemented method of claim 2, comprising the step of optimizing by the webAR application.

18. The computer-implemented method of claim 17, wherein the optimizing comprises one or more of occlusion culling; pose estimation; efficient rendering; level-of-detail management; and frame rate optimization.

19. The computer-implemented method of claim 2, comprising the step of virtually anchoring, by the webAR application, the first virtual object to a real-world surface represented in the camera feed.

* * * * *